United States Patent
Moss et al.

(10) Patent No.: US 10,488,232 B2
(45) Date of Patent: Nov. 26, 2019

(54) ROTAMETER WITH INTEGRATED VALVE

(71) Applicant: Dwyer Instruments, Inc., Michigan City, IN (US)

(72) Inventors: Robert Austin Moss, Saint Joseph, MI (US); Marcus A. Thoreson, San Pierre, IN (US)

(73) Assignee: DWYER INSTRUMENTS, INC., Michigan City, IN (US)

( * ) Notice: Subject to any disclaimer, the term of this patent is extended or adjusted under 35 U.S.C. 154(b) by 109 days.

(21) Appl. No.: 14/988,116

(22) Filed: Jan. 5, 2016

(65) Prior Publication Data

US 2016/0195414 A1 Jul. 7, 2016

Related U.S. Application Data

(60) Provisional application No. 62/099,701, filed on Jan. 5, 2015.

(51) Int. Cl.
*F16K 31/54* (2006.01)
*G01F 1/22* (2006.01)
(Continued)

(52) U.S. Cl.
CPC ............... *G01F 1/22* (2013.01); *F16K 29/00* (2013.01); *F16K 31/00* (2013.01); *F16K 31/445* (2013.01);
(Continued)

(58) Field of Classification Search
CPC .......... F16K 29/00; F16K 31/00; F16K 31/54; F16K 31/50; F16K 31/40; F16K 31/46; F16K 31/445; G01F 1/22; G01F 15/005
(Continued)

(56) References Cited

U.S. PATENT DOCUMENTS 2,463,809 A 3/1949 Sacchini
2,536,836 A 1/1951 Bowling
(Continued)

OTHER PUBLICATIONS

International Search Report corresponding to the International App. No. PCT/US2016/012156, dated Aug. 25, 2016, 4 pages.

*Primary Examiner* — Marina Tietjen
(74) *Attorney, Agent, or Firm* — Tarolli, Sundheim, Covell & Tummino LLP

(57) ABSTRACT

A rotameter includes a rotameter body including an inlet, an outlet, and a flow channel that provides fluid communication between the inlet and the outlet. A valve for controlling fluid flow through the inlet includes an actuator rotatable about a first axis. The actuator includes worm gear threads. The valve also includes a valve drive element rotatable about a second axis that extends transverse to the first axis. The valve drive element includes worm gear teeth that mate with the worm gear threads on the actuator so that rotation of the actuator about the first axis imparts rotation of the valve drive element about the second axis. The valve drive element further includes first screw threads that rotate with the valve drive element about the second axis. The first screw threads are configured and arranged to mate with and engage second screw threads to cause linear movement of a valve component along the second axis in response to rotation of the valve drive element. The linear movement of the valve component opens and closes the valve.

18 Claims, 17 Drawing Sheets

(51) Int. Cl.
  *F16K 31/50* (2006.01)
  *F16K 31/46* (2006.01)
  *F16K 31/44* (2006.01)
  *G01F 15/00* (2006.01)
  *F16K 29/00* (2006.01)
  *F16K 31/00* (2006.01)

(52) U.S. Cl.
  CPC .............. *F16K 31/46* (2013.01); *F16K 31/50* (2013.01); *F16K 31/54* (2013.01); *G01F 15/005* (2013.01)

(58) Field of Classification Search
  USPC ....................................................... 251/249.5
  See application file for complete search history.

(56) References Cited

U.S. PATENT DOCUMENTS

| | | |
|---|---|---|
| 4,050,305 A | 9/1977 | Evans et al. |
| 4,317,375 A | 3/1982 | Egert |
| 5,507,190 A * | 4/1996 | Guttmann ................. G01F 1/22 73/861.57 |
| 2004/0216888 A1 | 11/2004 | Schmidt et al. |
| 2005/0072464 A1 | 4/2005 | Schmidt et al. |

* cited by examiner

ROTAMETER WITH INTEGRATED VALVE

RELATED APPLICATION

This application claims the benefit of U.S. Provisional Application Ser. No. 62/099,701, filed Jan. 5, 2015, the subject matter of which is hereby incorporated by reference in its entirety.

TECHNICAL FIELD

The present disclosure is directed to measuring and metering fluid flow. More specifically, the present disclosure is directed to a rotameter that includes an integrated valve.

BACKGROUND

A rotameter is a variable area flow meter used to measure and control the flow of liquid through a conduit. Rotameters include a flow tube that has a tapered, e.g., conical, configuration. The rotameter is mounted vertically with the narrow end of the tapered flow tube at the bottom and the widened end at the top. The rotameter is arranged in the fluid circuit such that fluid flow passes through the flow tube from bottom to top.

Rotameters include a non-buoyant indicator, such as a piston or pellet, that is positioned in the flow tube and movable in the tube along an axis that coincides with the direction of flow through the tube. The indicator can be simply disposed in the flow tube and movable freely therein. This can be the case, for example, with smaller, relatively low flow rate rotameters in which the indicator is a pellet-type indicator. The indicator can also be supported in the flow tube, for example, by a rod that is centrally disposed in the flow tube and along which the indicator can slide freely. This can be the case, for example, with a larger, relatively high flow rate rotameters in which the indicator is a piston-type indicator. Regardless of the configuration, the indicator is configured so that there is a clearance, typically an annular clearance, between the flow tube and the indicator.

In use, fluid flows into the rotameter through an inlet, enters the flow tube at or near the bottom, travels upward along the tube, and exits the tube through an outlet at or near the top of the rotameter. As the fluid flows upward along the flow tube, it flows around the indicator while, at the same time, acts on the indicator and pushes or otherwise urges the indicator to move upward in the flow tube. Because the flow tube is tapered and positioned so that it widens as fluid flows upward in the tube, for a given fluid flow rate, the fluid velocity in the flow tube decreases as it travels up the tube. Thus, for a given flow rate, the magnitude of the force acting on the indicator due to flow within the tube decreases as the indicator travels upward within the tube. Because of this, for a given flow rate, there is a point within the flow tube where the weight of the indicator is in balance with the force exerted by the flow.

Due to these principles of operation, the position of the indicator in the flow tube corresponds to the rate of fluid flow through the rotameter. The correlation between indicator position and flow through the rotameter can be indicated by viewing the position of the indicator against indicia on the rotameter body indicative of the flow rate associated with that position. This indicia can, for example, be a graduated scale adjacent a translucent window through which the indicator can be viewed.

By constructing the rotameter body, i.e., the flow tube, with precise dimensions, and constructing the indicator with a consistent shape and weight, the correlation between indicator position and flow through the meter can be calculated and the indicia applied accordingly. These can be verified by testing, for example, in a metrology lab. In many constructions, the rotameter body itself is constructed of a cast translucent acrylic material, which provides high strength for withstanding fluid pressures, allows for casting the tapered flow tube with precise dimensions, and permits the indictor to be viewed directly through the rotameter body.

A rotameter in combination with a valve can be used to meter or otherwise control fluid flow through a conduit. Adjusting the valve while viewing the rotameter allows a user to select a desired flow through the conduit. A valve capable of fine adjustments can produce correspondingly fine adjustments to the flow rate through the rotameter. In some constructions, the valve can be an integrated component of the rotameter design. In this case, the rotameter can be used to control and monitor fluid flow with a high degree of precision.

As rotameters increase in size to accommodate higher flow rates, their cost increases exponentially due to the cost of the acrylic material required to cast the body of the meter. The increased size of the valve required for these larger rotameter constructions can increase the amount of acrylic material necessary for its construction. Since conventional rotameter constructions adopt an elongated rectangular configuration, an increase in valve size can require an increase in cross-sectional area of the rotameter body not only in the area of the valve, but along its entire length. Therefore, it can be desirable to construct an integrated rotameter valve that is compact in size and allows for fine adjustments.

SUMMARY

The present invention relates to a system and apparatus for measuring fluid flow. According to one aspect, A rotameter includes a rotameter body including an inlet, an outlet, and a flow channel that provides fluid communication between the inlet and the outlet. A valve for controlling fluid flow through the inlet includes an actuator rotatable about a first axis. The actuator includes worm gear threads. The valve also includes a valve drive element rotatable about a second axis that extends transverse to the first axis. The valve drive element includes worm gear teeth that mate with the worm gear threads on the actuator so that rotation of the actuator about the first axis imparts rotation of the valve drive element about the second axis. The valve drive element further includes first screw threads that rotate with the valve drive element about the second axis. The first screw threads are configured and arranged to mate with and engage second screw threads to cause linear movement of a valve component along the second axis in response to rotation of the valve drive element. The linear movement of the valve component opens and closes the valve.

According to another aspect, alone or in combination with any preceding aspect, the valve drive element can include a shuttle sleeve and the valve component can include a valve shuttle. The first screw threads can be internal screw threads on the shuttle sleeve, and the second screw threads can be external screw threads formed on a stem portion of the valve shuttle. The stem portion of the valve shuttle can be received in the shuttle sleeve so that the first and second screw threads engage each other. The shuttle sleeve can be rotatable about the second axis in response to rotation of the actuator about the first axis. The engagement between the first and second screw threads causes the linear movement of the valve shuttle along the second axis in response to rotation of the shuttle sleeve about the second axis.

According to another aspect, alone or in combination with any preceding aspect, the worm gear teeth can be formed on an outer surface of the shuttle sleeve and the worm gear teeth and the first screw threads can be arranged along the same portion of the length of the shuttle sleeve.

According to another aspect, alone or in combination with any preceding aspect, the valve can include a valve housing for supporting the valve shuttle and shuttle sleeve. The stem of the valve shuttle can include a flat that engages a surface of the housing, which prevents rotation of the stem and helps ensure that rotation of the shuttle sleeve causes linear movement of the valve shuttle.

According to another aspect, alone or in combination with any preceding aspect, the housing can have a two piece construction configured to receive the valve shuttle threaded into the shuttle sleeve.

According to another aspect, alone or in combination with any preceding aspect, the housing can include portions that act as bushings for supporting the shuttle sleeve for rotation relative to the housing.

According to another aspect, alone or in combination with any preceding aspect, the valve shuttle can include a seal plate constructed of a material that facilitates a good seal with the material used to construct the rotameter body.

According to another aspect, alone or in combination with any preceding aspect, a rotameter valve can include a valve shuttle configured to move linearly along a first axis to move the valve from an open condition to a closed condition. The valve shuttle can include external screw threads. The rotameter valve can also include a shuttle sleeve rotatable about the first axis. The shuttle sleeve can include external worm gear teeth and internal screw threads for receiving the external screw threads of the valve shuttle. The rotameter valve can further include an actuator rotatable about a second axis that extends transverse to the first axis. The actuator can include worm gear threads that mate with the worm gear teeth on the shuttle sleeve so that rotation of the actuator about the second axis imparts rotation of the valve stem about the first axis. Rotation of the shuttle sleeve about the first axis causes linear movement of the valve shuttle along the first axis due to engagement of the screw threads.

According to another aspect, alone or in combination with any preceding aspect, the valve can also include a valve housing and the valve drive element can include a valve stem. The first screw threads can be external screw threads on the valve stem, and the second screw threads can be internal screw threads formed on a portion of the valve housing. The valve stem can be rotatable about the second axis in response to rotation of the actuator about the first axis. Engagement between the first and second screw threads can cause the valve stem to move linearly along the second axis in response to rotation about the second axis. The valve component can be supported by and travel linearly with the valve stem to open and close the valve.

According to another aspect, alone or in combination with any preceding aspect, the screw threads on the valve stem can occupy a first longitudinal section along the length of the valve stem, and the worm gear teeth can occupy a second longitudinal section along the length of the valve stem.

According to another aspect, alone or in combination with any preceding aspect, the length of the second longitudinal section can be selected to permit the valve stem to move longitudinally along the first axis while maintaining contact between the worm gear threads and the worm gear teeth.

According to another aspect, alone or in combination with any preceding aspect, the screw threads and worm gear teeth can be at least partially superimposed on each other and occupy the same longitudinal section of the valve stem.

According to another aspect, alone or in combination with any preceding aspect, the superimposed screw threads and worm gear teeth can produce component teeth arranged in helical rows and columns. The component teeth can have two pairs of opposing sides in which one pair engages the worm gear threads to produce rotation of the valve stem and the other pair engages the screw threads on the valve housing to produce longitudinal movement along the first axis.

According to another aspect, alone or in combination with any preceding aspect, the valve stem can include a plate support piece for supporting a seal plate on a terminal end of the valve stem. The plate support piece can facilitate rotation of the seal plate about the first axis relative to the valve stem.

According to another aspect, alone or in combination with any preceding aspect, the valve stem and the plate support piece can be constructed of the same material in order to minimize wear due to frictional engagement between those parts during use. The plate support piece can isolate the seal plate from the frictional engagement to facilitate the seal plate being constructed of a material that facilitates a good seal with the material used to construct the rotameter body.

According to another aspect, alone or in combination with any preceding aspect, the valve stem can include a head that is configured for sliding engagement with a channel on the plate support piece to connect the plate support piece to the valve stem and to facilitate the rotation of the support piece relative to the stem. The plate support piece can include a head that is configured for sliding engagement with a channel on the seal plate to connect the seal plate to the plate support piece.

According to another aspect, alone or in combination with any preceding aspect, a rotameter valve can include a valve stem configured to move linearly along a first axis to move the valve from an open condition to a closed condition. The valve stem can include screw threads that cause the linear movement in response to rotation of the valve stem about the first axis. The rotameter valve can also include an actuator rotatable about a second axis that extends transverse to the first axis. The actuator can include worm gear threads that mate with worm gear teeth on the valve stem so that rotation of the actuator about the second axis imparts rotation of the valve stem about the first axis.

According to another aspect, alone or in combination with any preceding aspect, the rotameter body can include a valve chamber for receiving the valve housing. The valve chamber is in fluid communication with the inlet and helps to define an aperture through which fluid can flow from the inlet into the flow channel. The valve is actuatable to control fluid flow through the aperture.

According to another aspect, alone or in combination with any preceding aspect, the valve can include a seal plate connected to the valve drive element. The valve can be actuatable to move the seal plate into engagement with portions of a valve chamber wall surrounding the aperture to close the valve and block fluid flow through the aperture.

According to another aspect, alone or in combination with any preceding aspect, the worm gear threads and worm gear teeth in combination form a worm gear for actuating the valve.

According to another aspect, alone or in combination with any preceding aspect, the worm gear threads and worm gear teeth are selected to produce a gear reduction in which a single rotation of the valve drive element requires multiple rotations of the actuator.

According to another aspect, alone or in combination with any preceding aspect, the gear reduction is 4:1, wherein a single rotation of the valve drive element requires four rotations of the actuator.

According to another aspect, alone or in combination with any preceding aspect, the worm gear threads have four starts and the valve drive element includes sixteen worm gear teeth.

According to another aspect, alone or in combination with any preceding aspect, the inlet can include threads for engaging a threaded adaptor to connect the adaptor to the rotameter body. The adaptor can be connectable with a conduit for delivering fluid to the rotameter. The adaptor when threaded into the inlet can secure the valve in the valve chamber.

According to another aspect, alone or in combination with any preceding aspect, the actuator can extend through the rotameter body, and the rotameter can further include a control knob connected to the actuator outside the rotameter body. The knob can be manually rotatable to control the valve.

According to another aspect, alone or in combination with any preceding aspect, the rotameter can further include an indicator positioned in the flow channel and viewable against indicia on the rotameter body. The indicator can move in response to flow in the channel and indicate via the indicia the magnitude of the fluid flow through the channel.

According to a further aspect, a rotameter valve includes a valve stem configured to move linearly along a first axis to move the valve from an open condition to a closed condition. The valve stem can include screw threads that cause the linear movement in response to rotation of the valve stem about the first axis. The rotameter valve can also include an actuator rotatable about a second axis that extends transverse to the first axis. The actuator can include worm gear threads that mate with worm gear teeth on the valve stem so that rotation of the actuator about the second axis imparts rotation of the valve stem about the first axis.

BRIEF DESCRIPTION OF THE DRAWINGS

The present invention is illustrated by way of example and not limitation in the figures of the accompanying drawings, in which like references indicate similar elements and in which.

DESCRIPTION

Figure 1:
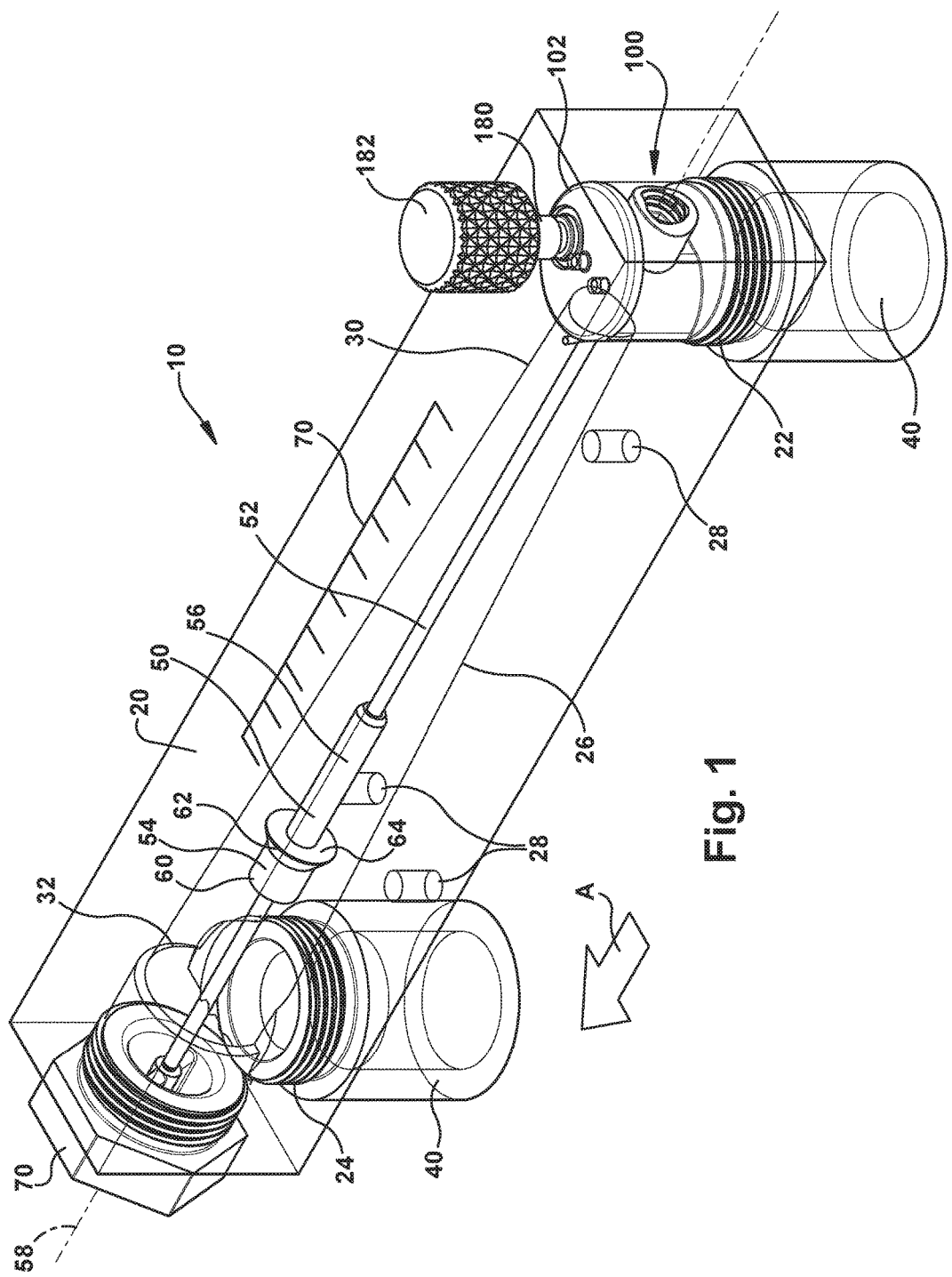
FIG. 1 is a perspective view of an apparatus for measuring and metering fluid flow, according to the invention.
Figure 2:
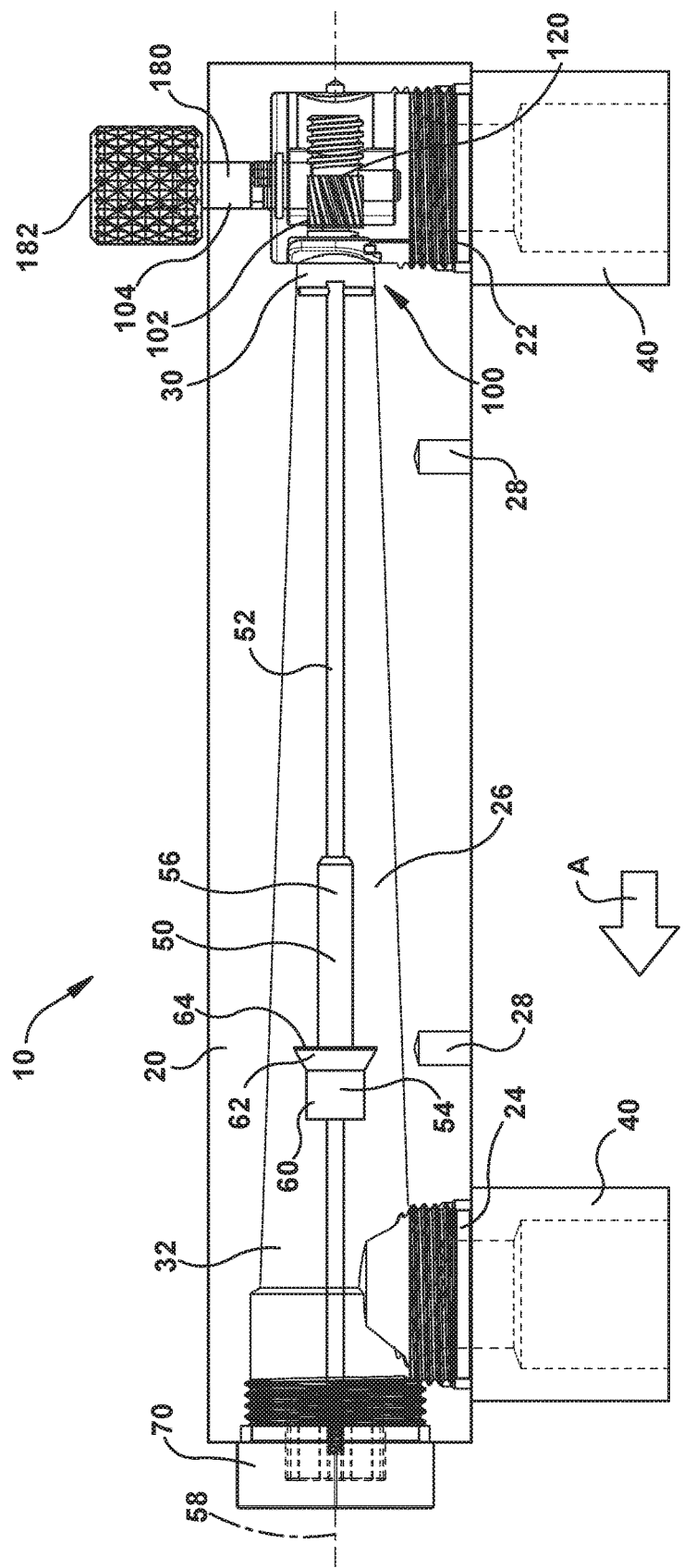
FIG. 2 is a side elevation view of the apparatus illustrated in FIG. 1.
Figure 3:
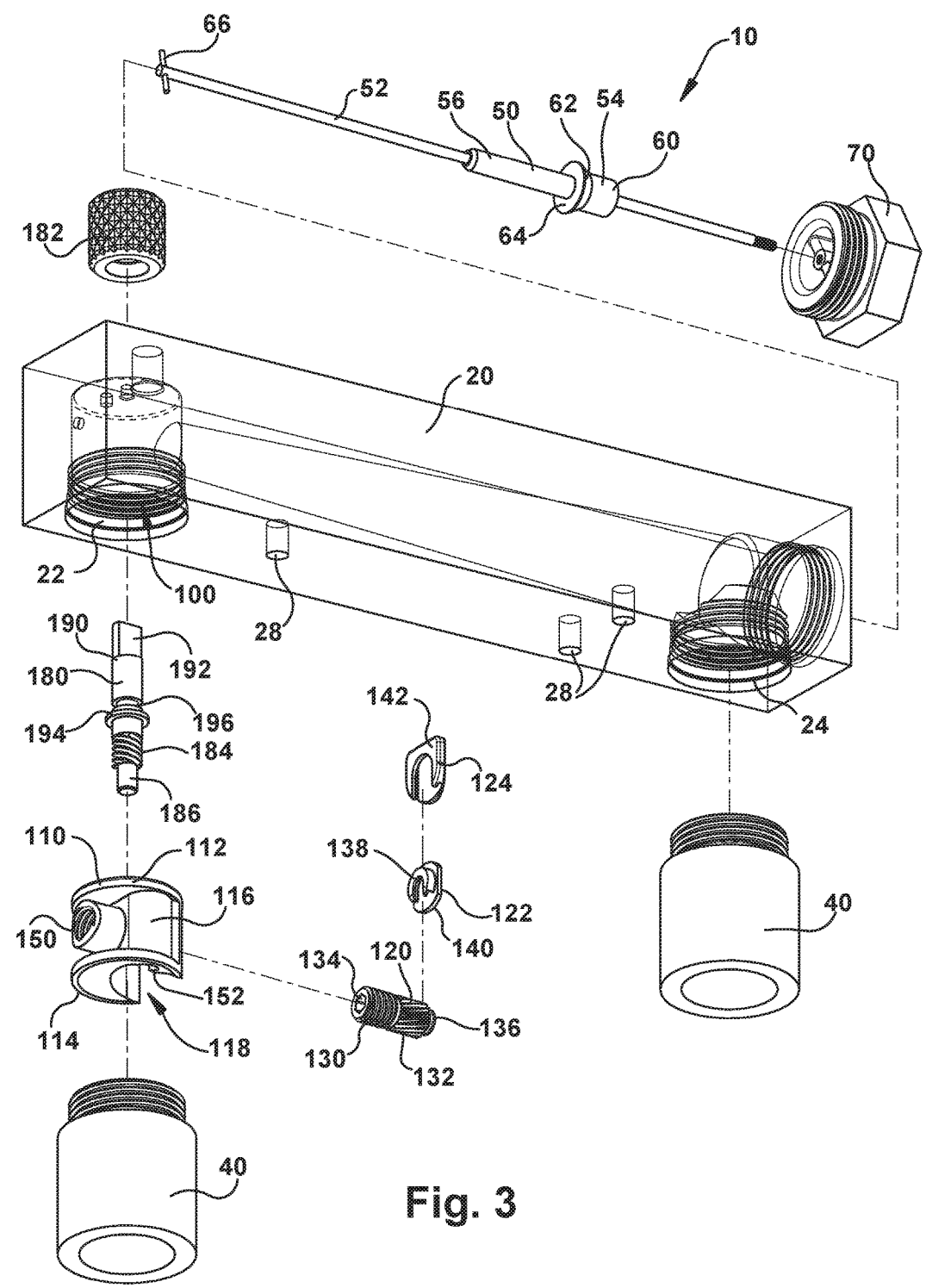
FIG. 3 is an exploded perspective view of the apparatus illustrated in FIG. 1.

Referring to FIGS. 1-3, an apparatus for measuring and metering fluid flow comprises a rotameter. The rotameter 10 includes a rotameter body 20 with an inlet port 22, one or more outlet ports 24 and a flow tube 26 that extends between the inlet and outlet ports. The flow tube 26 has a tapered, conical configuration and is arranged with its narrow end 30 positioned adjacent or near the inlet port 22 and its wide end 32 positioned adjacent or near the outlet port(s) 24. At the inlet end, the body 20 includes a valve chamber 100 that is positioned between the inlet port 22 and the flow tube 26 and that provides fluid communication between the inlet port and the flow tube. During use, the rotameter 10 is configured to be oriented vertically, with the inlet port 22 having a bottom position and the outlet port 24 having a top position. Mounting holes 28 can facilitate mounting the rotameter 10 in this manner.

The inlet port 22 and outlet port 24 each have a cylindrical configuration with internal screw threads formed thereon. The ports 22, 24 are configured to receive threaded adaptors 40 that facilitate connections with the piping, tubing, or other fluid conduits (not shown) that deliver fluid to and from the rotameter 10. The adaptors 40 can, for example, include portions comprising a standard polyvinylchloride (PVC) coupling, e.g., a female coupling, for receiving PVC conduit, which can be secured in a known manner using conventional PVC cement.

The rotameter 10 also includes an indicator 50 that is supported within the flow tube 26 by a rod 52 connected to a cap 70 secured to the body 20 at the outlet end of the rotameter 10 via a threaded connection. The indicator 50 has a hollow central channel through which the rod 52 extends. The indicator 50 can thus slide along the length of the rod 52. The indicator 50 and rod 52 are constructed of materials, such as polished stainless steel, that exhibit relatively low sliding friction with each other so that the indicator can slide freely along the length of the rod. A transversely extending pin 66 stabilizes a free end of the rod 52 in the flow channel 26.

The indicator 50 has a head portion 54 and a tubular tail portion 56 that are positioned coaxially with each other and with the rod 52 along the axis 58. The tail portion 56 has a chamfered end portion that offers little resistance to fluids flowing around the indicator 50 in the flow tube 26. The head portion 54 has a cylindrical top portion 60 and a flared portion 62 that terminates with a face 64 that extends transverse, e.g., perpendicular, to the axis 58. The face 64 is presented facing opposite the fluid flow direction, which is indicated generally by arrow A in FIGS. 1-2. Fluid flow in the flow tube 20 thus engages and exerts a force on the face 64 that causes the indicator 50 to slide along the rod 52 in response to the fluid flow in the flow tube 26.

The body 20 includes indicia 70 that facilitate ascertaining the flow through the rotameter 10. Use of the indicia 70 for this purpose requires the ability of the user to view the indicator 50 against the indicia. Use of the rotameter 10 therefore requires that the user be able to view the indicator 50 in the flow channel 20. Because of this, the body 20 can be constructed of a cast acrylic material, which is translucent and also strong, durable, and offers some corrosion resistance. Advantageously, a cast acrylic construction can allow for a one-piece construction of the body 20. The surface of the body 20 can be polished to achieve a smooth, glass-like appearance, and the indicia 70 can be disposed, e.g., printed or silk screened, on the surface.

The rotameter 10 also includes a valve or valve assembly 102 supported in the valve chamber 100 of the body 20. Referring to FIG. 3, the valve assembly 102 includes a valve housing 110 that is formed of a material, such as molded plastic, and therefore has a one piece construction. The valve housing 110 has spaced semi-circular or cylindrical end portions 112, 114 that are configured and arranged to mate with a cylindrical inner surface of the valve chamber 100 when the valve assembly is received in the rotameter body 20.

The valve housing 110 includes a housing wall 116 that extends between the end portions 112, 114 has a configuration contoured to define a recess or space 118 for receiving an assemblage comprising a valve drive element in the form of a valve stem 120, a plate support piece 122, and a seal plate 124. The valve stem 120 includes a portion that includes external screw threads 130 and a portion that includes external worm gear teeth 132.

A terminal end of the valve stem 120 adjacent the screw threads 130 includes an axially extending hexagonal bore 134. A terminal end of the valve stem 120 adjacent the worm gear teeth includes a round head 136 that is configured for sliding engagement with a channel 138 on the plate support piece 122 to connect the plate support piece to the valve stem. Similarly, the plate support piece 122 includes a head 140 that is configured for sliding engagement with a channel 142 on the seal plate 124 to connect the seal plate to the plate support piece. The plate support piece 122 thus connects the seal plate 124 to the valve stem. This connection, established by the sliding engagement of the round head 136 in the channel 138, allows the valve stem 120 to rotate relative to the plate support piece 122 and the seal plate 124.

The valve housing 110 includes an internally threaded collar 150 that extends from the housing wall 116 opposite the recess 118. The collar 150 is configures to receive the screw threaded portion 130 of the valve stem 120. The hexagonal bore 134 in the end of the valve stem 120 facilitates or assists in making and adjusting the threaded connection between the valve stem and the collar 150.

The valve assembly 102 also includes an actuator 180 and a knob 182 for manually rotating the actuator. The actuator 180 has the form of a generally cylindrical shaft and includes a portion upon which external worm gear threads 184 are formed. Adjacent the worm gear threads 184, a terminal end of the actuator 180 forms a cylindrical pin portion 186. An end portion 190 of the actuator 180 opposite the pin portion 186 receives the knob 182 and includes a flat 192 configured to engage and interconnect the knob to the actuator. Between the worm gear threads 184 and the end portion 190, are an annular shoulder 194 and an O-ring groove 196 for receiving an O-ring (not shown).

The recess 118 defined by the wall 116 of the valve housing 110 is also configured to receive the actuator 180. To this end, the valve housing 110 includes a cylindrical receiver portion 200 configured to receive the pin portion 186 and support the actuator 180 for rotation relative to the valve housing 110.

Referring to FIGS. 4-9, in an assembled condition of the valve assembly 102, the pin portion 186 of the actuator 180 is positioned in the receiver portion 200 of the valve housing 110, and the actuator is thereby rotatable relative to the valve housing about an axis 210. The seal support 140 is assembled with the seal plate 142, and that assemblage is assembled with the valve stem 120 via the head 136. The screw threads 130 of the valve stem 120 are threaded into the collar portion 150 of the valve housing 110, with the assistance of a hex tool via the hex socket 134, if needed, and the valve stem is thereby rotatable relative to the valve housing about an axis 212.

The assembled valve assembly 102 can then be inserted into the valve chamber 100 of the rotameter body 20. Locator pins 214 on the valve housing 110 can be received by corresponding openings in the valve chamber 100 to orient and fix the position of the valve assembly 102 relative to the rotameter body 20. The actuator 180 extends through an actuator opening 104 (see FIG. 2) in the rotameter body 20, so that the knob can 182 be affixed to the end portion 190. An O-ring 216 (see FIGS. 4-5) can help provide a liquid seal between the actuator 180 and the actuator opening 104. The valve assembly 102 is locked in place within the valve chamber 100 by the adaptor 40, when screwed into the inlet 22. The adaptor 40 applies a compressive force to the valve housing 110, which presses the housing into the valve chamber 100 and fortifies further the seal that prevents leakage through the actuator opening 104.

The actuator 180 and the valve stem 120 extend perpendicular to each other with the axes 210, 212 offset laterally from each other. In this assembled configuration, the actuator worm gear threads 184 mate with the valve stem worm gear teeth 132. Due to this engagement, the engagement between the actuator 180 and valve stem is that of a worm gear in which rotation of the actuator about the axis 210 will impart rotation of the valve stem 120 about the axis 210. Due to the engagement of the valve stem screw threads 130 with the threaded collar 150 of the valve housing 110, rotation of the valve stem 120 about the axis 210 also imparts longitudinal movement of the valve stem along that axis 210, which opens/closes the valve.

Figure 4:
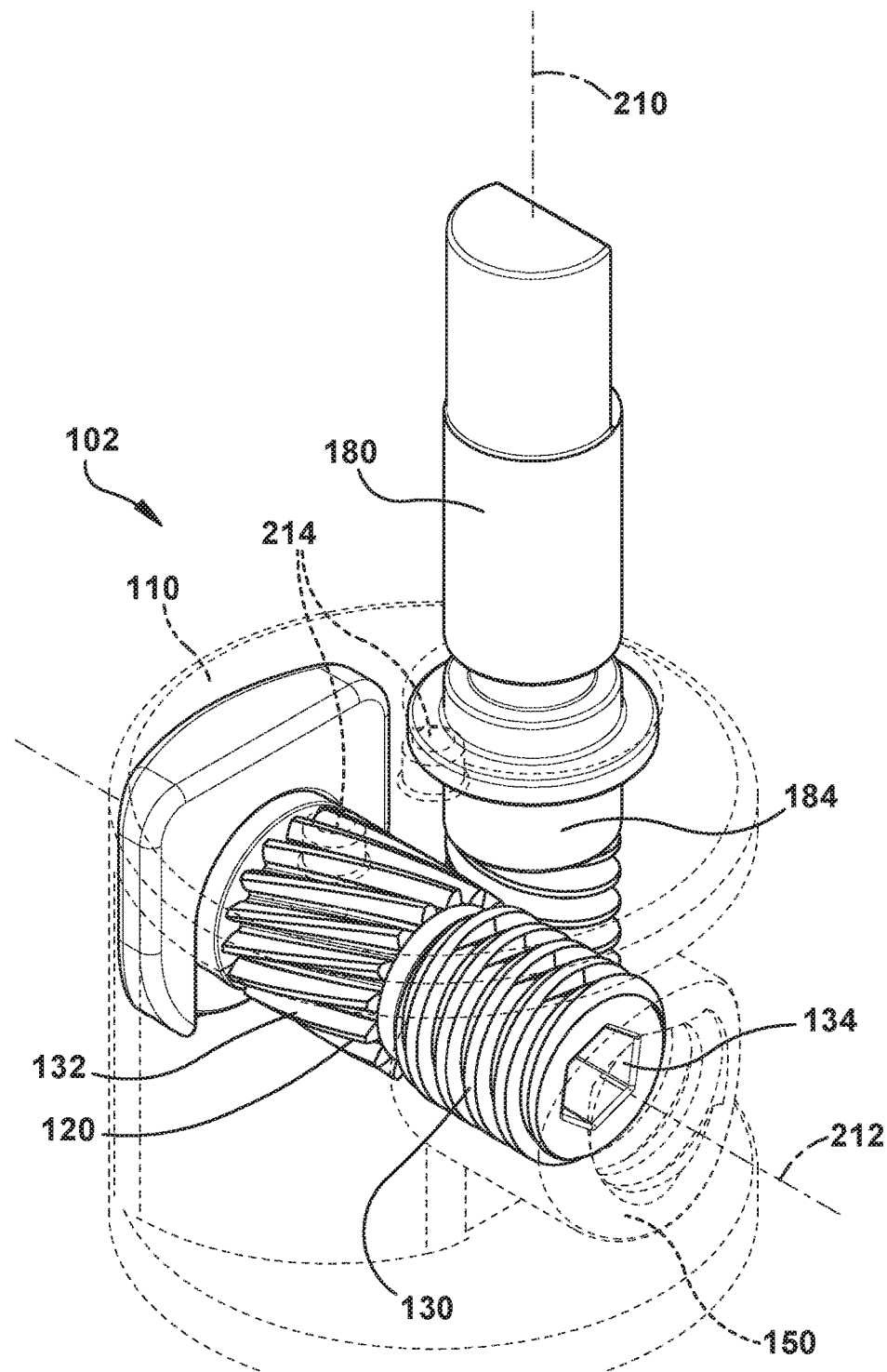
FIG. 4 is a perspective view of a portion of the apparatus of FIG. 1 that illustrates the apparatus in a first condition.
Figure 5:
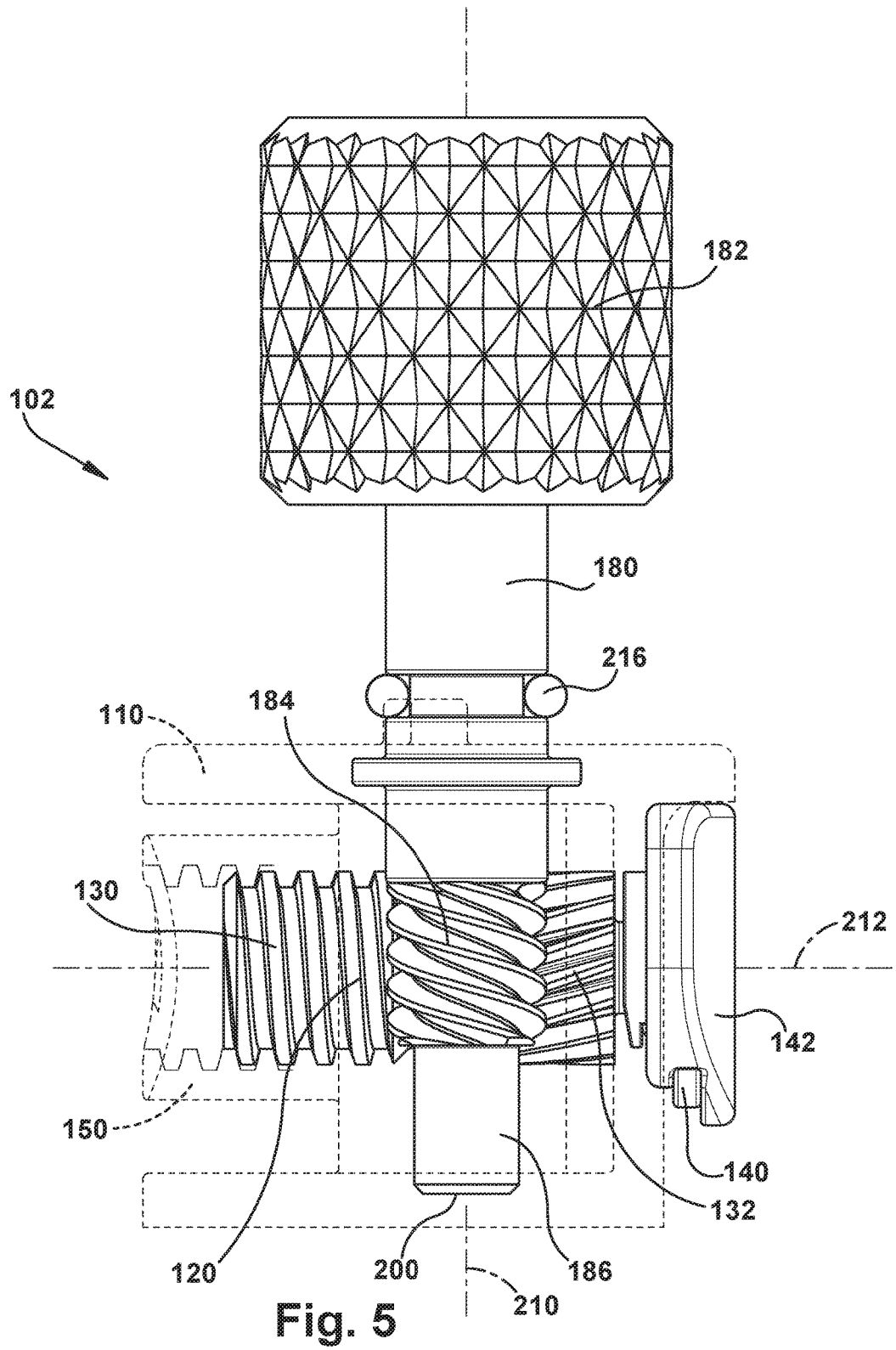
FIG. 5 is a side elevation view of the portion of the apparatus illustrated in FIG. 4.
Figure 6:
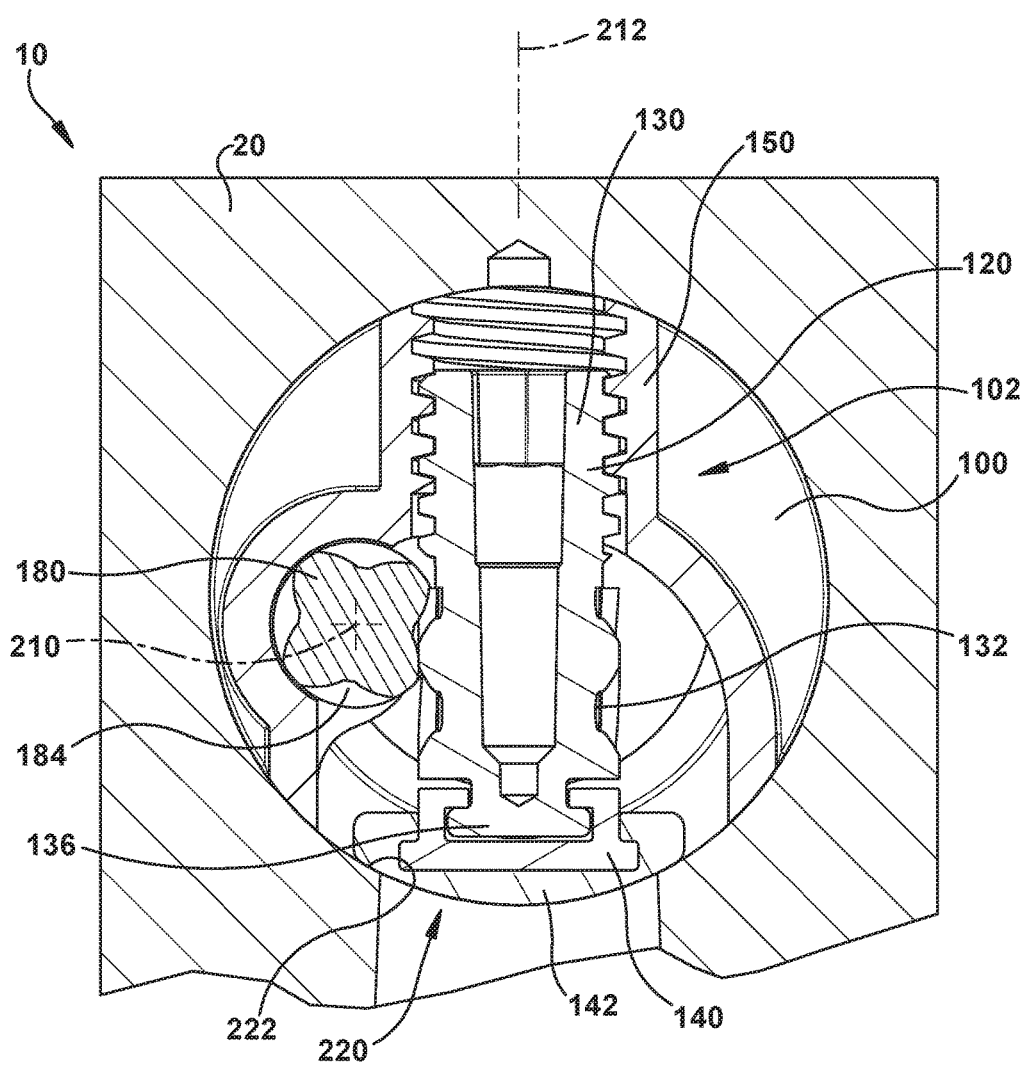
FIG. 6 is a sectional view of the portion of the apparatus illustrated in FIG. 4.
Figure 7:
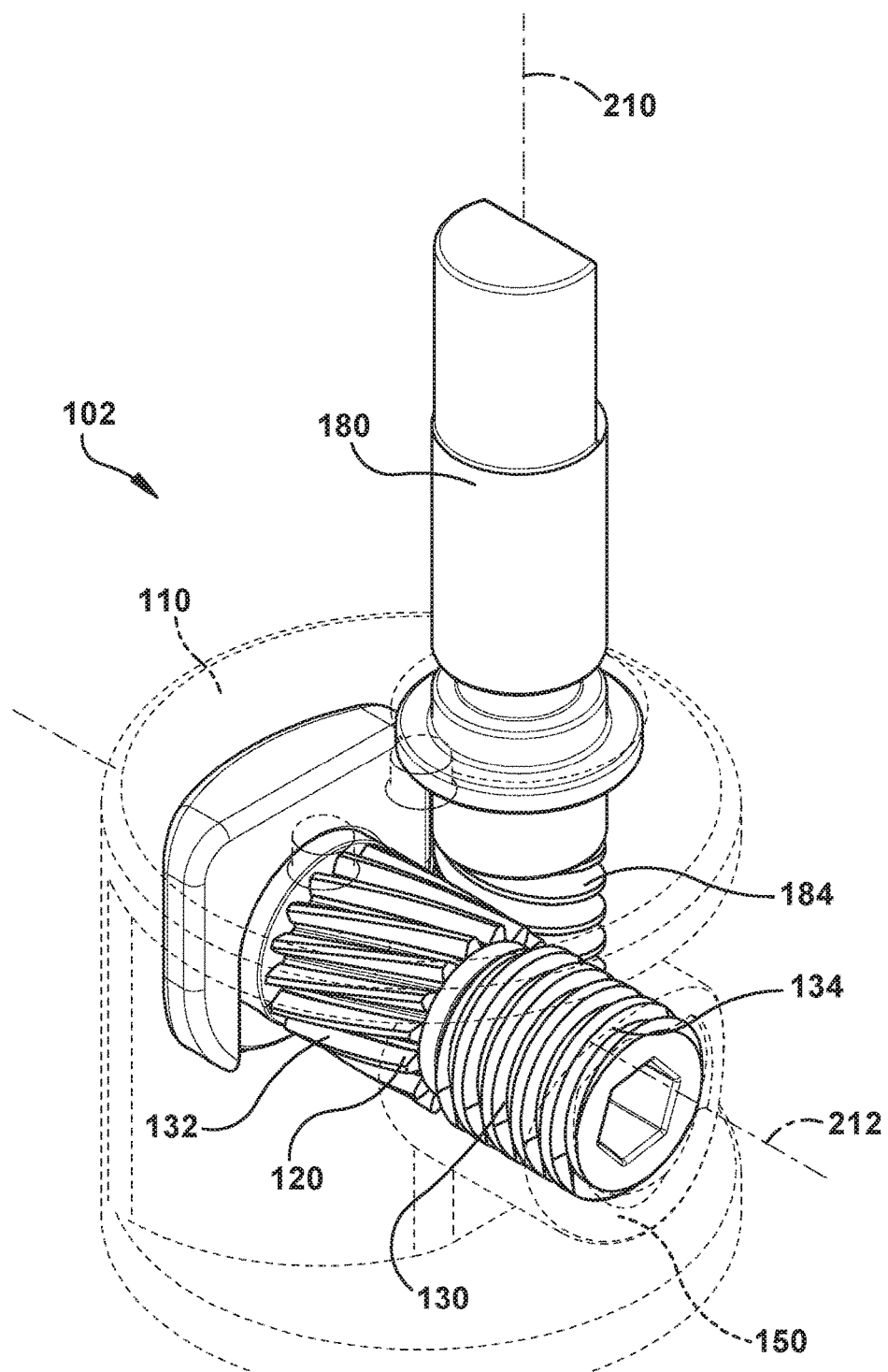
FIG. 7 is a perspective view of a portion of the apparatus of FIG. 1 that illustrates the apparatus in a first condition.
Figure 8:
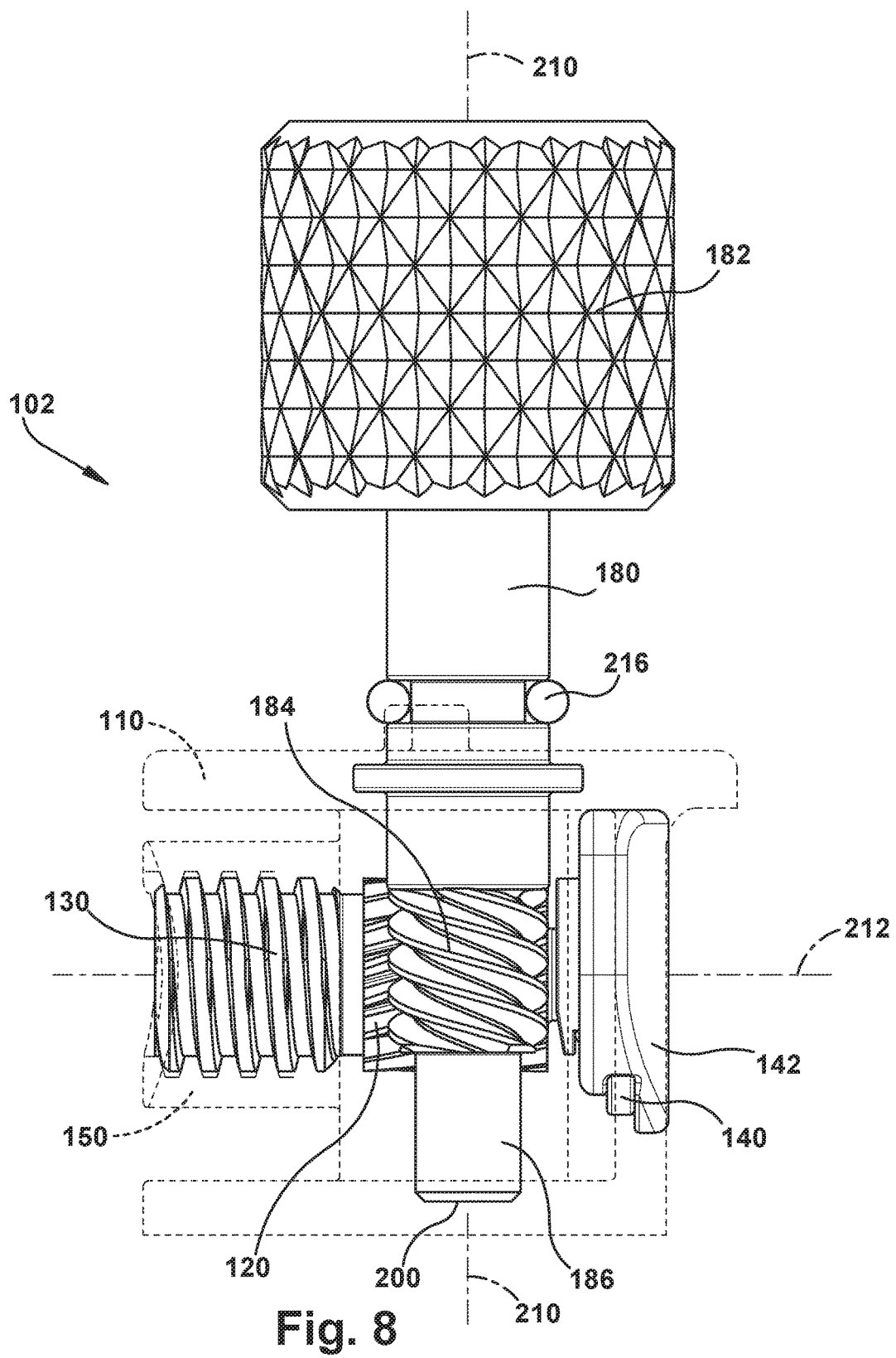
FIG. 8 is a side elevation view of the portion of the apparatus illustrated in FIG. 7.
Figure 9:
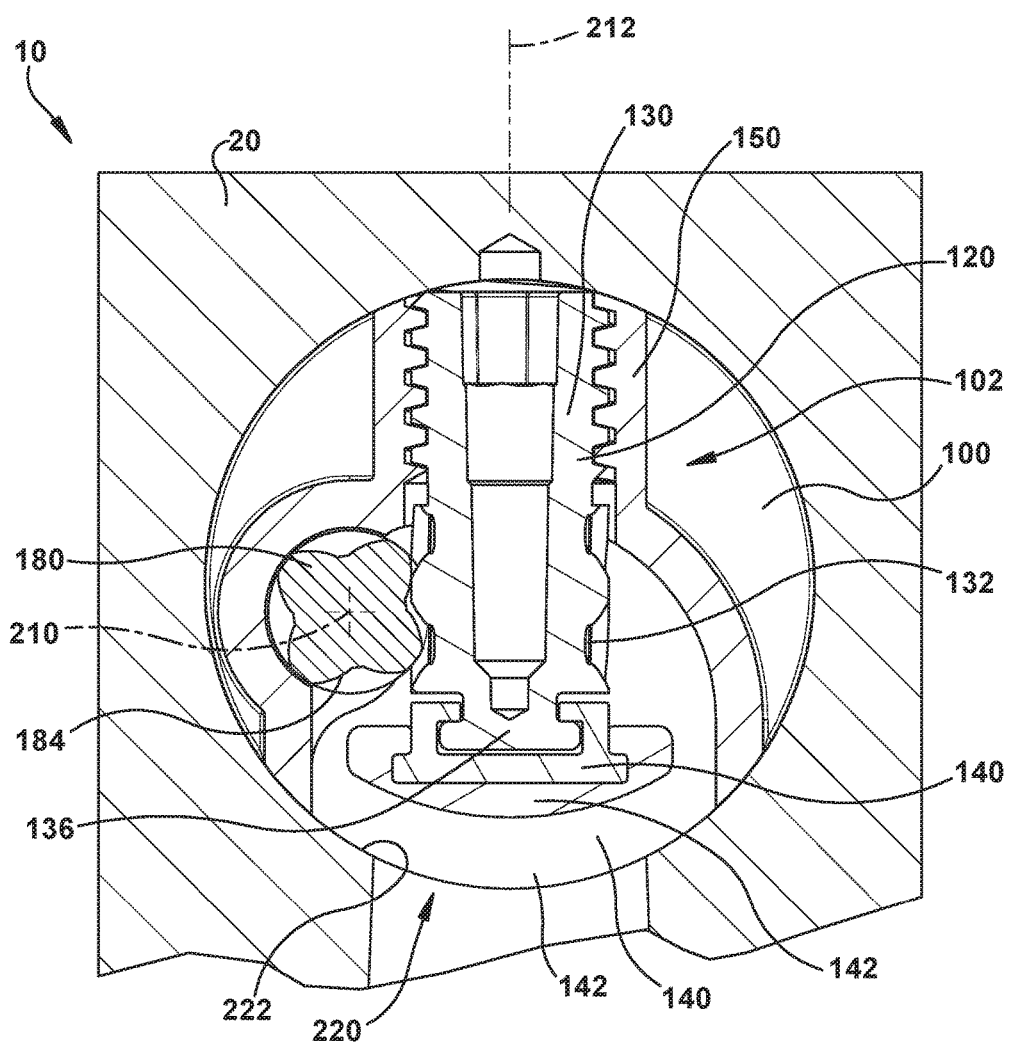
FIG. 9 is a sectional view of the portion of the apparatus illustrated in FIG. 7.

Through rotation of the actuator 180, the valve 102 is actuatable from a closed condition, shown in FIGS. 4-6, to an open condition, shown in FIGS. 7-9. In the open condition, the seal plate 142 is spaced from an orifice 220 that provides fluid communication between the valve chamber 100 and the flow tube 26. Thus, in the open condition, fluid can flow into the inlet 22 via the adaptor 40, through the valve chamber 100 and through the orifice 220 into the flow tube 26. In the flow tube 26, the fluid engages the indicator 50, and the fluid forces acting on the indicator cause the indicator to slide along the rod 52, thus providing to the user indication, by way of the indicia, of the flow rate through the rotameter 10.

In the closed condition, the valve stem 120 urges the seal plate 142 against the portion of the valve chamber wall 222 surrounding the orifice 220 and thus blocks fluid flow through the orifice. Adjusting the valve 102 between the open and closed condition produces a corresponding adjustment to the amount of fluid permitted to flow through the orifice 220 and, consequently, through the rotameter 10. Viewing the flow rate via the indicator 50/indicia 70 combination thus permits a user to adjust the flow through the rotameter to a desired level.

The combination worm gear/screw thread actuation feature of the valve assembly 102 is advantageous because it provides for fine-tuning of the fluid flow that is metered through the rotameter 10. This is because the worm gears, by nature, can have high gear reduction values. As a result, the valve assembly 102 can be configured so that shuttling the valve stem 120 from full-opened to full-closed, and vice versa, requires multiple rotations of the actuator 180. This permits the user to effectuate very small changes in the position of the valve stem 120 with ease and repeatability, which in turn allows for fine adjustments to the fluid flow through the rotameter 10.

The gear reduction value of worm gears depends on the ratio the number of worm gear teeth to worm thread starts. Worm thread "starts" refers to the actual number of worm gear threads, with the understanding that the worm driver, in this case the actuator 180, can include multiple individual helical worm gear threads 184 arranged in a nested configuration about the circumference of the actuator. The ratio, expressed as the number of worm gear teeth to worm thread starts, is, in turn, the ratio of actuator rotations to produce a corresponding number of valve stem rotations.

For instance, in the example embodiment illustrated in FIGS. 1-9, the worm gear threads 184 on the actuator 180 can have four starts and the valve stem 120 can include sixteen worm gear teeth 132. In this example, the worm gear reduction ratio would be 16:4 or 4:1, meaning that four complete rotations of the actuator would produce one complete rotation of the valve stem. Since it is the rotation of the valve stem 120 that results in its opening/closing via the screw threads 130, it becomes clear that the number of turns required to move the valve stem from fully-closed to fully-open is a matter of selecting the appropriate combination of worm gear ratio for the actuator and valve stem, along with the appropriate configuration and dimensions of the valve stem screw threads. This provides an advantageously high degree of resolution in selecting and fine-tuning the flow through the rotameter 10.

The combination worm gear/screw thread actuation feature of the valve assembly 102 is also advantageous because it provides these high-resolution features in a small and compact design a valve capable of permitting comparatively high flow rates through the rotameter 10. This design allows the entire valve assembly, save the knob 182 and the knob portion 190 of the actuator 180, to be positioned within a space, i.e., the valve chamber 100, that has essentially the same or slightly larger diameter as the outside diameter (O.D.) of the conduit that delivers the fluid to the rotameter 10. This can help to minimize the required size of the rotameter body 20. This can be especially advantageous because the body 20, when formed from a cast acrylic material, is the most expensive component of the rotameter 10 to produce.

The configuration of the valve assembly 102 described and illustrated in the preceding paragraphs and with reference to FIGS. 1-9 is not meant to limit the scope of the invention to that particular configuration. The configurations of the valve assembly 102 and the various components thereof can be altered or otherwise changed without departing from the spirit and scope of the invention. For example, although the valve stem 120 and actuator 180 of the embodiment illustrated in FIGS. 1-9 are shown and described as being arranged on offset, perpendicular axes 210, 212, those skilled in the art will appreciate that it is not necessary that those axes extend perpendicular to each other. The worm gears 132, 184 on the valve stem 120 and actuator 180 can be configured so that the axes 210, 212 extend at non-perpendicular angles relative to each other.

Figure 10:
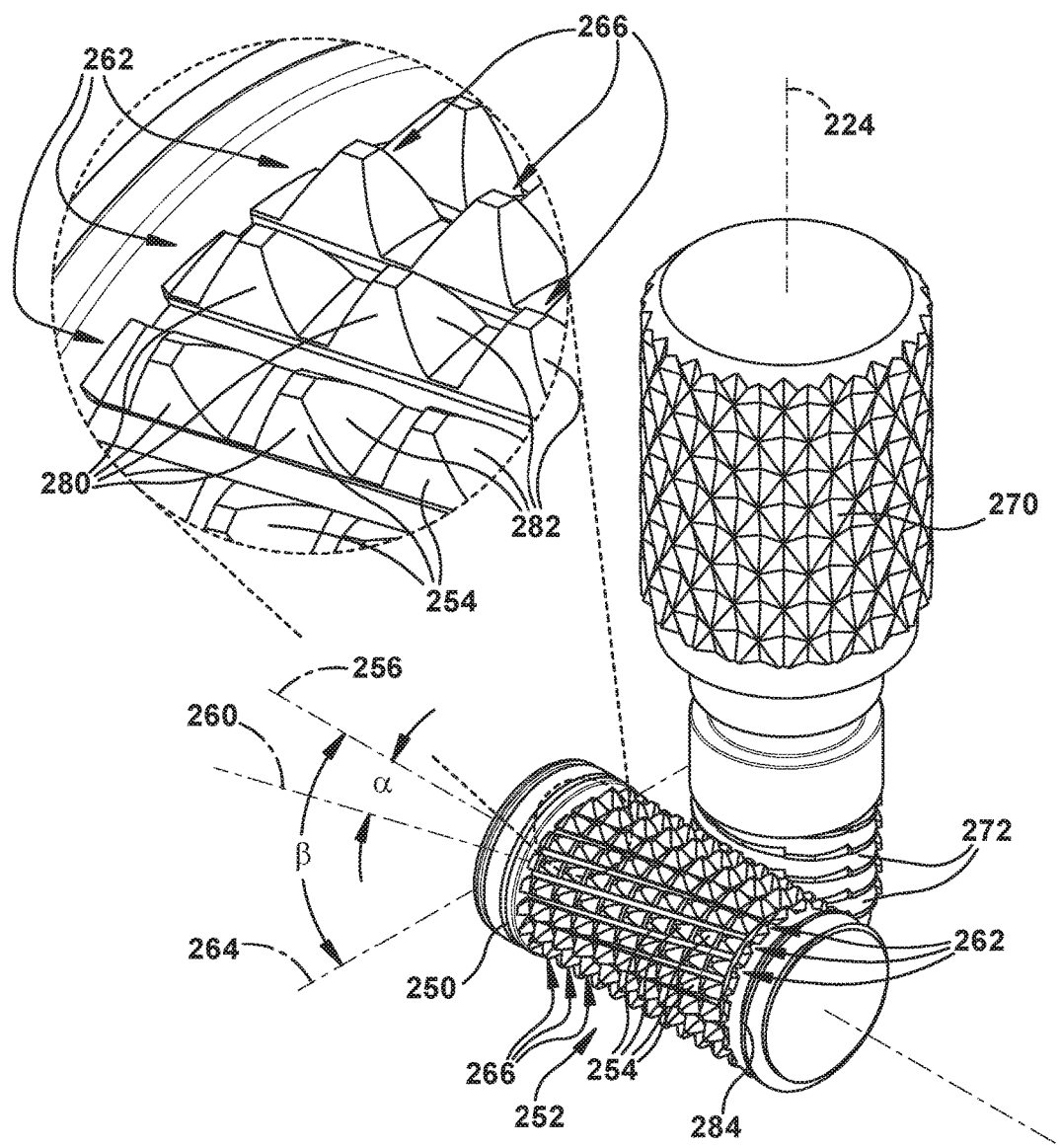
FIG. 10 is a perspective view of an apparatus for measuring and metering fluid flow, according to another aspect of the invention.
Figure 11:
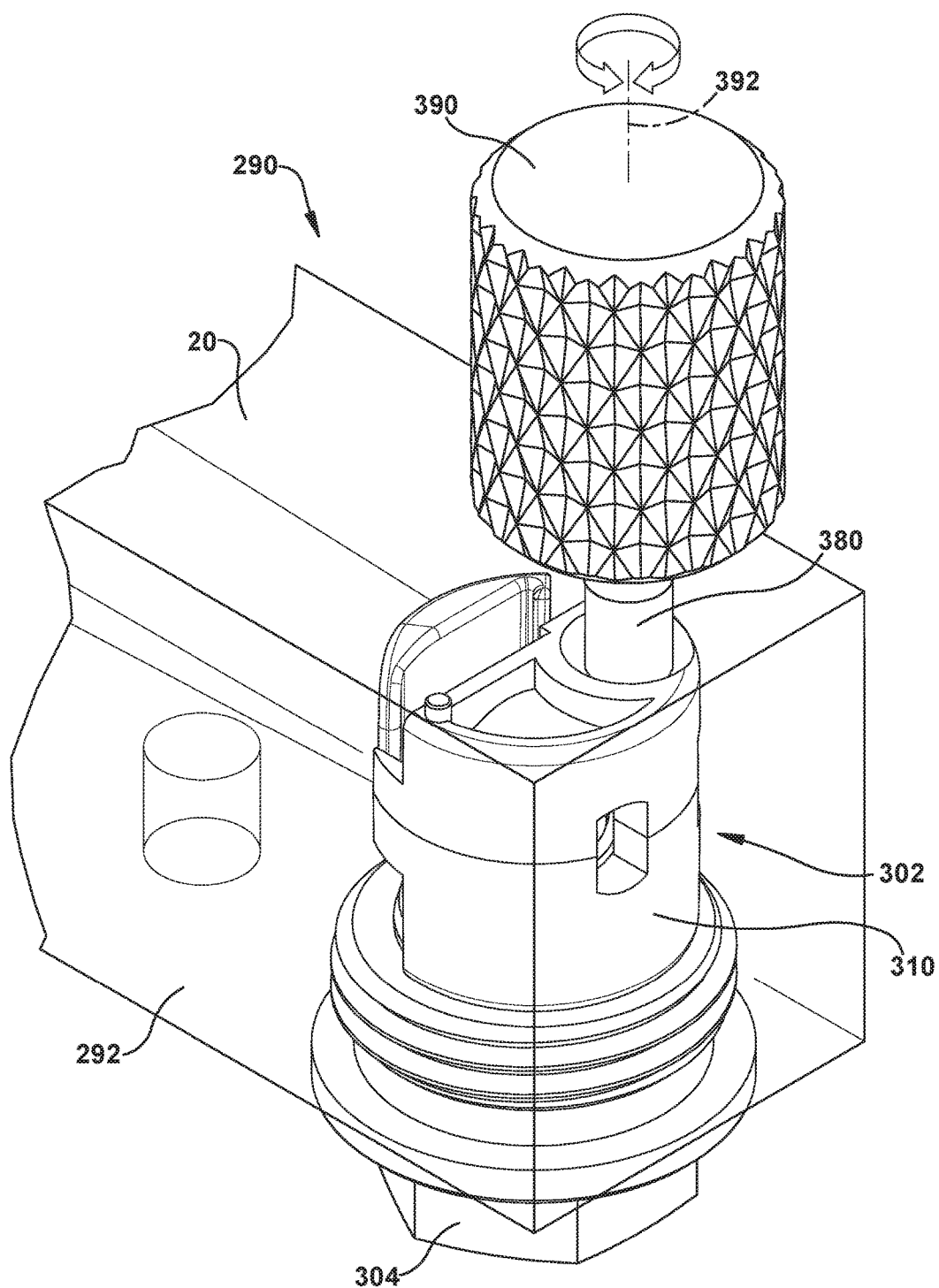
FIG. 11 is a perspective view of an apparatus for measuring and metering fluid flow, according to another aspect of the invention.
Figure 12:
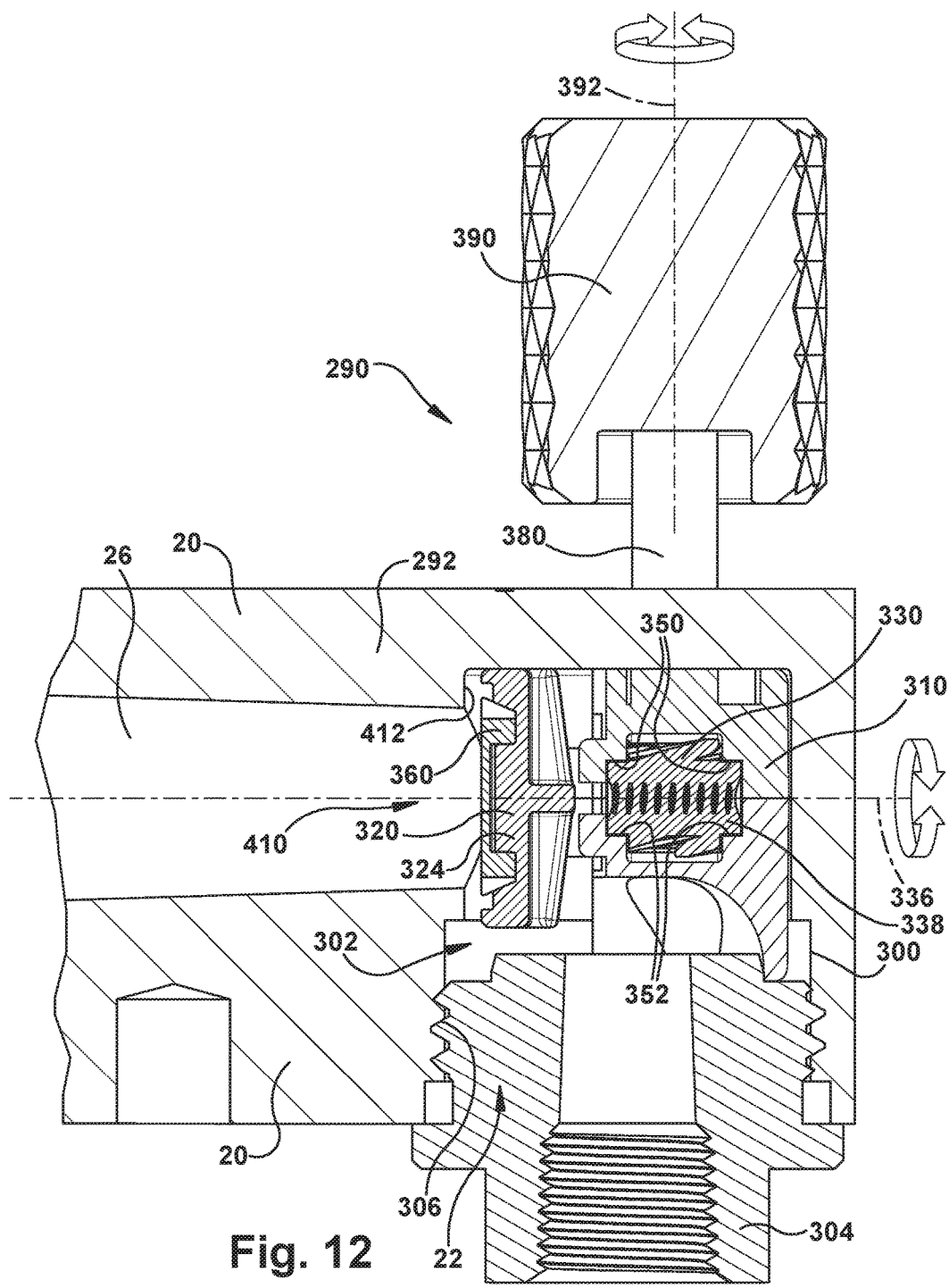
FIG. 12 is a side elevation view of the apparatus illustrated in FIG. 11.

Another example configuration of the invention is illustrated in FIG. 10. In this embodiment, the valve stem 250 includes combination threads 252 that have both worm gear and screw thread components. In this configuration, the combination threads 252 have the appearance of a plurality of component teeth 254 that are arranged in a pattern that has both worm gear and screw thread "components." Considered with reference to the axis 256 about which the valve stem 250 rotates, the teeth 254 are arranged in longitudinally extending helical rows along a helical tooth axis 260, which has a small helix angle $\alpha$. The helical rows of teeth 254 extending along tooth axis 260 define the worm gear component 262 of the of the combination threads 252. The teeth 254 of the worm gear component 262 have worm surfaces 280.

Similarly, the teeth 254 are also arranged in more laterally extending helical rows along a helical tooth axis 264, which has a comparatively large helix angle $\beta$. The helical rows of teeth 254 extending along tooth axis 264 that define the screw thread component 266 of the of the combination threads 252. The teeth 254 of the screw thread component 266 have screw surfaces 282.

The actuator 270 includes worm gears 272 that mate with the worm gear component 262 of the combination threads 252. The worm gears 272 act on the worm surfaces 280 of the teeth 254 of the worm gear component 262. Rotation of the actuator 270 about the actuator axis 274 thus imparts rotation of the valve stem 250 about the valve stem axis 256. As the valve stem 250 rotates about the axis 256, the screw surfaces 282 of the teeth 254 of the screw thread component 266 react against the screw threads of the valve housing (not shown) to cause the valve stem to travel between the open and closed condition. To facilitate assembly of the valve, the valve stem may include one or more traditional starter screw threads 284.

Another example configuration of the invention is illustrated in FIGS. 11-17. In this embodiment, an apparatus for measuring and metering fluid flow comprises a rotameter. The rotameter 290 can include a rotameter body 292 that is similar or identical to that illustrated and described herein with reference to FIGS. 1-9 and thus can include an inlet port, outlet port, indicator, etc.

In the embodiment of FIGS. 11-17, the rotameter 290 includes a valve or valve assembly 302 supported in a valve chamber 300 of the rotameter body 292. The valve assembly 302 is retained in the valve chamber 300 by a threaded adaptor 304 secured to an inlet 306 of the rotameter body 292. The adaptor 304 facilitates a connection with the piping, tubing, or other fluid conduits (not shown) that deliver fluid to the rotameter 290.

The valve assembly 302 includes a valve housing 310. The valve housing 310 has a two piece molded plastic construction, including first and second valve housing parts 312, 314. The valve housing parts 312, 314 have semi-circular or cylindrical end portions that are configured and arranged to mate with a cylindrical inner surface of the valve chamber 300 when the valve assembly is received in the rotameter body 292.

The valve housing 310 is configured to receive a valve drive element in the form of a valve shuttle 320, a shuttle sleeve 330, and an actuator 380. The valve shuttle 320 includes a stem 322 including external screw threads 326 and a seal plate 324. The shuttle sleeve 330 includes external worm gear teeth 332 and internal screw threads 334. The actuator 380 includes a shaft 382 with worm gear threads 384 at one end and a keyed portion 386 at an opposite end. The keyed portion 386 is for receiving an actuator knob 390.

The valve shuttle 320 can be constructed as a single piece comprising the stem 322 and seal plate 324. A sealing member 360, constructed of a material conducive to forming a tight seal, can be applied to or assembled onto the seal plate. Alternatively, the valve shuttle 320 can be constructed of multiple components that can be assembled to form the valve shuttle. The seal plate 324 can be a single component or a multi-part component constructed of different materials selected to perfect the seal achieved in the closed condition of the valve 302. In one multi-part example, the seal plate 324 can act as a clip for receiving a sealing member constructed of a material different than that used to construct the valve shuttle and better suited for facilitating a seal in the closed condition of the valve 302. This connection can, for example, be similar or identical to the connection between the plate support piece and seal plate of the embodiment of FIGS. 1-9.

Unlike the embodiment of FIGS. 1-9, the valve housing 310 of FIGS. 11-17 includes no threaded portions. Instead, the housing 310 is configured to support the shuttle sleeve 330 and actuator 380 for rotation about their axes 336, 392, respectively. More specifically, the upper and lower housing parts 312, 314 include semi-cylindrical portions 350, 352, respectively, that together define cylindrical seats or bearing surfaces for supporting the cylindrical pin portions 338 at opposite ends of the shuttle sleeve 330, adjacent the worm gear threads 384, for rotation about the axis 336.

Additionally, the upper housing part 312 includes a cylindrical portion 400 that acts as a sleeve, bushing, or bearing surface for supporting the actuator shaft 382 for rotation about the axis 392. The lower housing part 314 includes cylindrical portion 402 that acts as a seat or bearing surface for supporting the pin portion 388 of the actuator 380 adjacent the worm gear threads 384 for rotation about the axis 392.

Referring to FIGS. 14-17, in an assembled condition of the valve assembly 302, the external threads 326 of the stem 322 of the valve shuttle 320 are threaded into the internal screw threads 334 of the shuttle sleeve 330. The pin portions 338 of the shuttle sleeve 330 are supported in the seats 350, 350 so that the shuttle sleeve can rotate relative to the valve housing 310. The stem 322 has a flat 328 formed along its length that engages a corresponding surface of a channel 354 of the valve housing 310, which prevents rotation of the valve shuttle 320 relative to the valve housing while permitting axial movement relative to the valve housing.

The pin portion 388 of the actuator 380 is supported in the seat 402 of the lower housing part 314. The shaft portion 382 of the actuator 380 extends through and is supported by the bushing portion 400 of the upper housing part 312. Assembled in this manner, the worm gear threads 384 of the stem 380 engage and mate with the worm gear teeth 332 of the shuttle sleeve 330.

Figure 13:
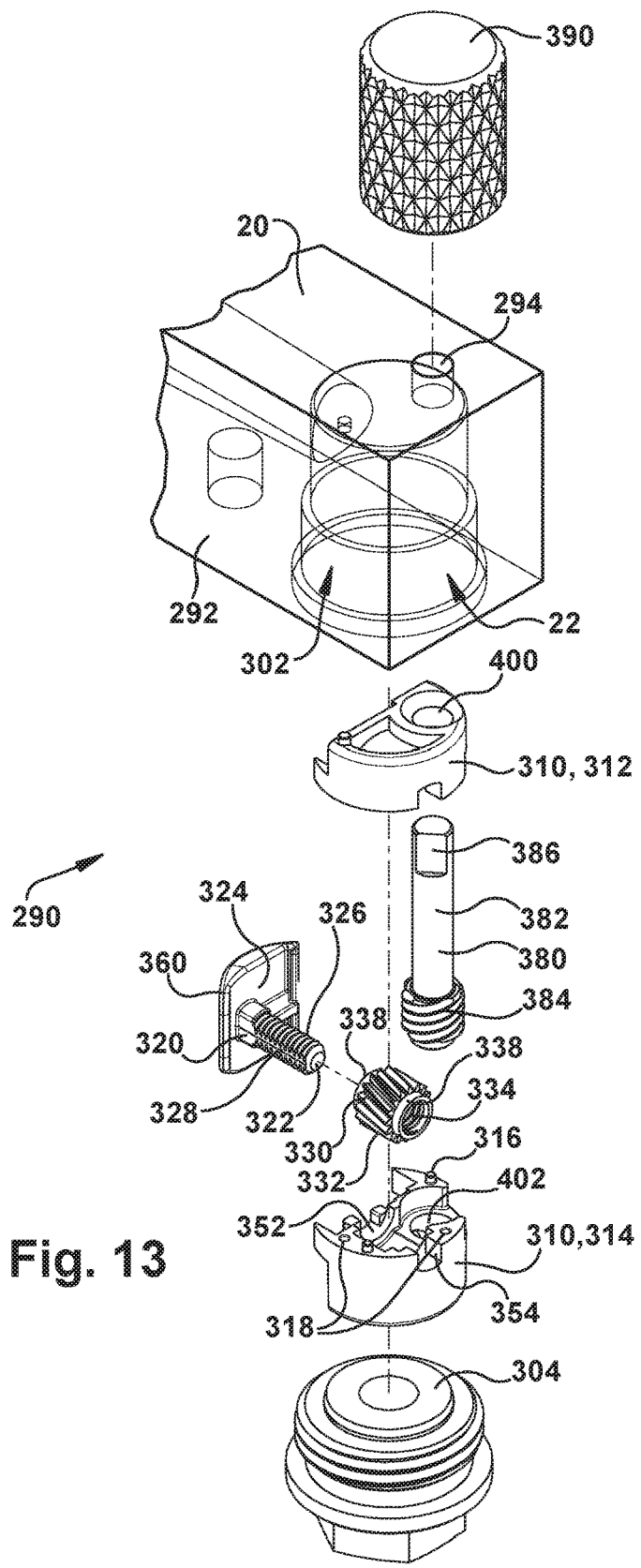
FIG. 13 is an exploded perspective view of the apparatus illustrated in FIG. 11.
Figure 14:
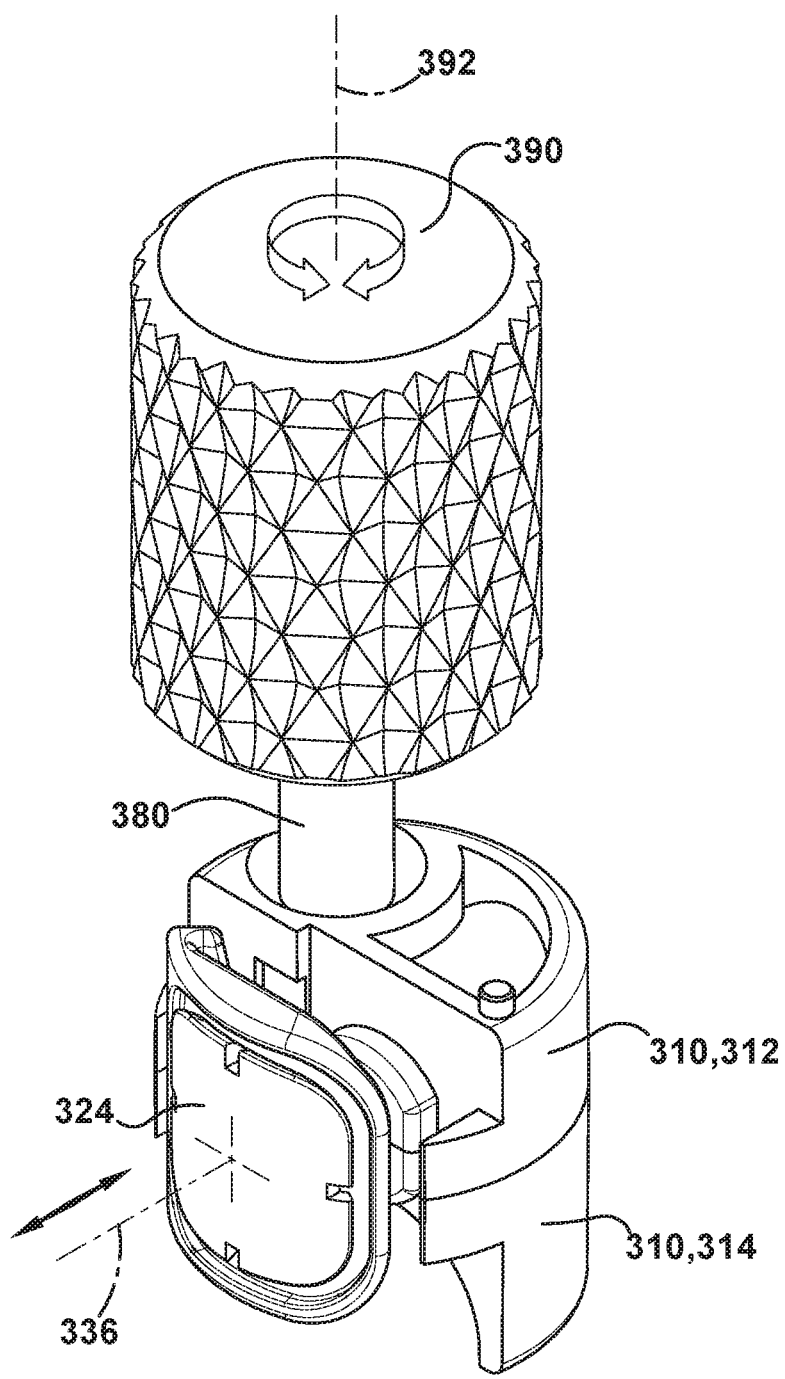
FIG. 14 is a perspective view of a portion of the apparatus of FIG. 11 that illustrates the apparatus in a first condition.

Alignment and assembly of the valve assembly 302 is facilitated by pins 316 on the first and second housing parts 312, 314 that are received in corresponding recesses on the first and second housing parts. For example, the valve housing 310 can included three such corresponding pins 316 and recesses 318. As shown in FIG. 13, the second housing part includes one pin 316 and two recesses 318. In this instance, the second housing part 314 would include one recess (not shown) and two pins (also not shown) that are configured and arranged to receive their counterpart connectors on the first housing part. The pins 316 and recesses 318 can be configured to have an interference or snap fit that holds the valve assembly 302 together until it can be installed and the connection be fixed via installation of the adaptor 304.

The assembled valve assembly 302 can then be inserted into the valve chamber 300 of the rotameter body 292. The actuator 380 extends through an actuator opening 294 (see FIG. 13) in the rotameter body 292, which orients and fixes the position of the valve assembly 302 relative to the rotameter body. Thereafter, the actuator knob 390 can be affixed to the end portion 386 of the actuator 380. An O-ring or other suitable seal (not shown) can help provide a liquid seal between the actuator 380 and the actuator opening 294. The valve assembly 302 is locked in place within the valve chamber 300 by the adaptor 304, when screwed into the inlet 306. The adaptor 304 applies a compressive force to the valve housing 310, which maintains the connection of the housing parts 312, 314, presses the housing into the valve chamber 300, and fortifies further the seal that prevents leakage through the actuator opening 304.

Due to the engagement between the worm gear threads 384 on the actuator 380 and the worm gear teeth 332 on the shuttle sleeve 330, rotation of the actuator about the axis 392 imparts rotation of the shuttle sleeve about the axis 336. Due to the threaded engagement between the external screw threads 326 on the stem 322 and the internal threads 334 on the shuttle sleeve 330, and since engagement between the stem flat 328 and the channel 354 prevents rotation of the stem, rotation of the shuttle sleeve causes linear movement of the valve shuttle 320 along the axis 336. Therefore, rotation of the actuator 380 about the axis 392 imparts linear travel of the valve shuttle 320 along the axis 336, which opens/closes the valve.

Figure 15:
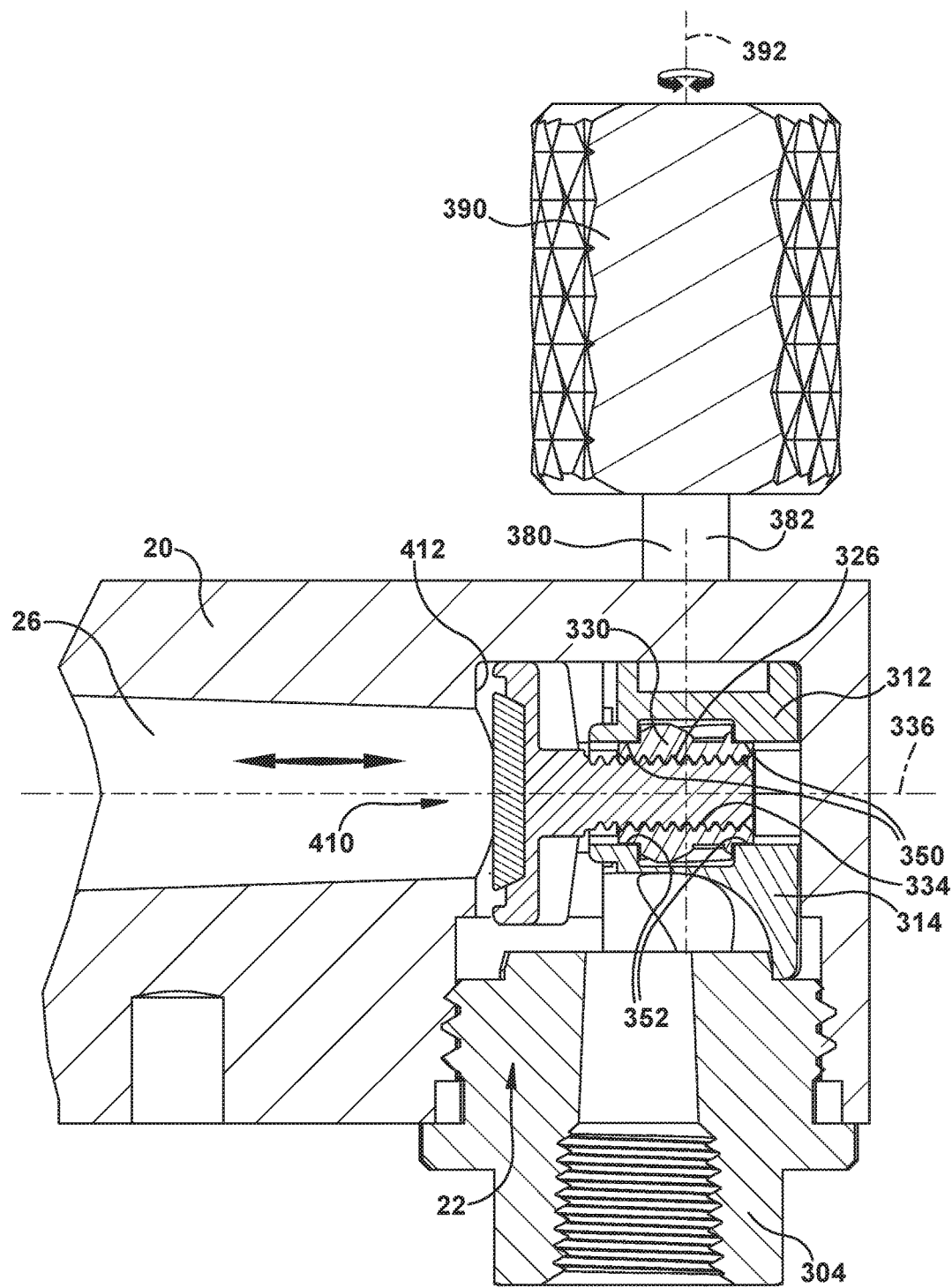
FIG. 15 is a perspective view of a portion of the apparatus of FIG. 11 that illustrates the apparatus in a second condition.
Figure 16:
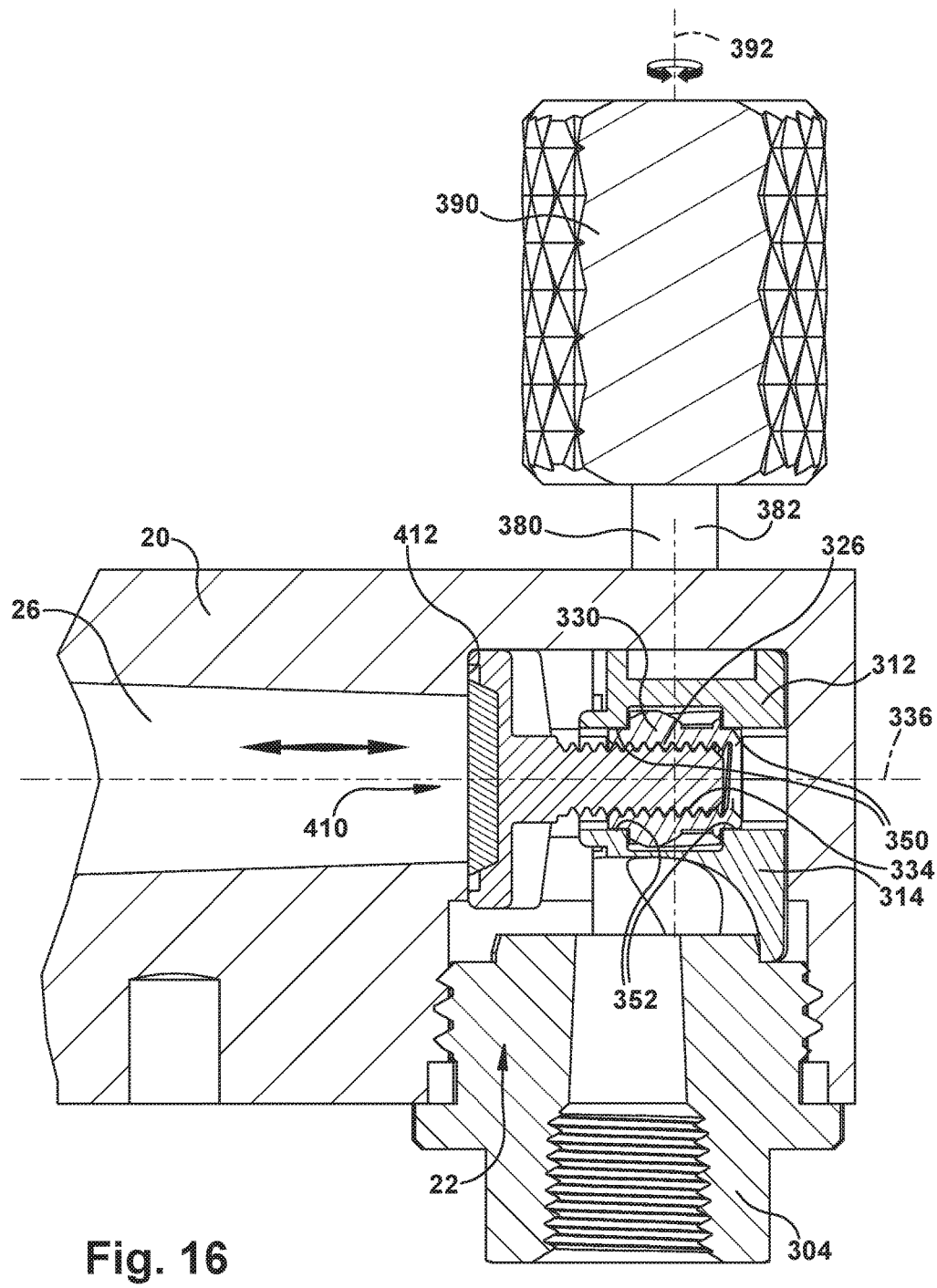
FIGS. 16 and 17 are side elevation views of a portion of the apparatus illustrated in FIG. 11 with certain portions shown in phantom.
Figure 17:
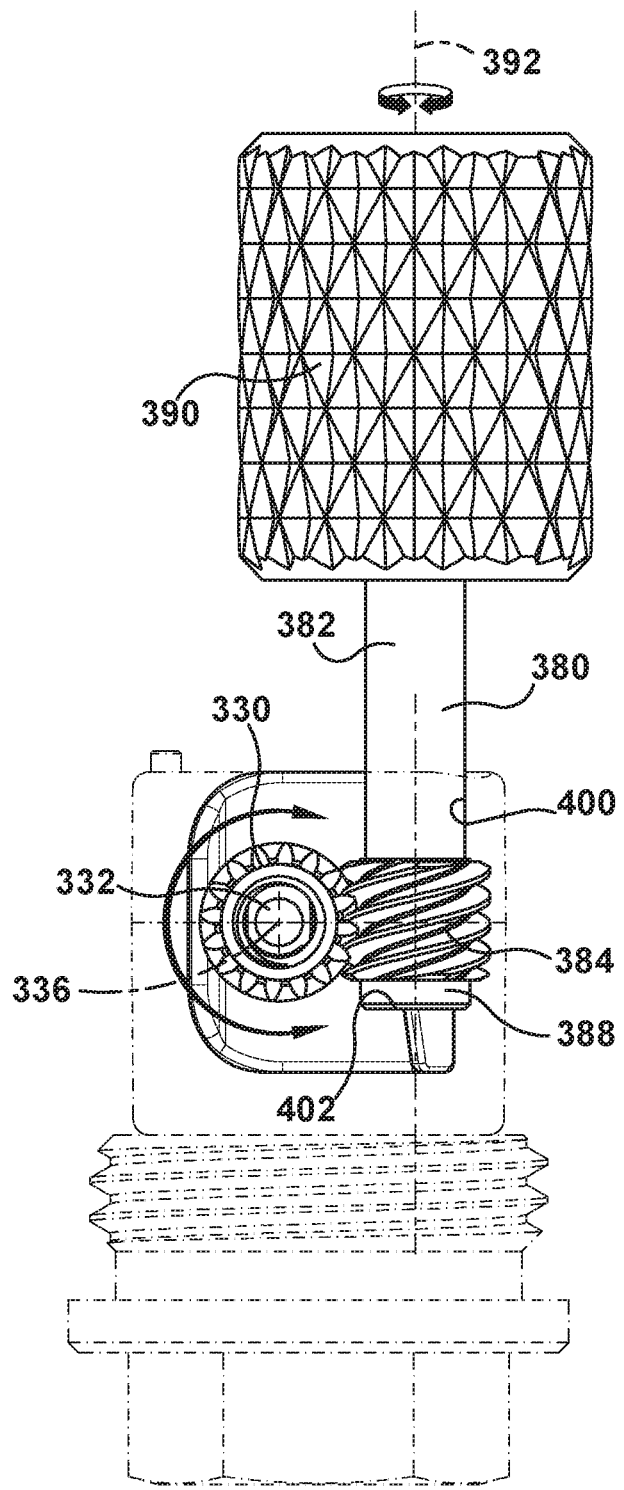

In the assembled condition of the rotameter 290, the valve shuttle 320 travels linearly along the axis 336 between a full-closed condition shown in FIG. 15 and a full-open condition of FIG. 16. The position of the valve shuttle 320, and thus the percent open/closed condition of the valve 302, can be fine tuned through manual adjustments made via rotating the actuator 380.

In the open condition, the seal plate 324 is spaced from an orifice 410 that provides fluid communication between the valve chamber 300 and the flow tube 26. Thus, in the open condition, fluid can flow into the inlet port 22 via the adaptor 304, through the valve chamber 300 and through the orifice 410 into the flow tube 26. Once in the flow tube 26, the fluid engages and operates an indicator 50 (see, e.g., FIG. 1) in a manner similar or identical to that described herein with regard to the embodiment of FIGS. 1-9 to provide to the user indication, by way of the indicia, of the flow rate through the rotameter 290.

In the closed condition, the seal plate 324 against the portion of the valve chamber wall 412 surrounding the orifice 420 and thus blocks fluid flow through the orifice. Adjusting the valve 302 between the open and closed condition produces a corresponding adjustment to the amount of fluid permitted to flow through the orifice 410 and, consequently, through the rotameter 290. Viewing the flow rate via the indicator 50/indicia 70 combination (see, e.g., FIG. 1) thus permits a user to adjust the flow through the rotameter to a desired level.

The combination worm gear/screw thread actuation feature of the valve assembly 302 is advantageous because it provides for fine-tuning of the fluid flow that is metered through the rotameter 30. This is because the worm gears, by nature, can have high gear reduction values. As a result, the valve assembly 302 can be configured so that shuttling the valve shuttle 320 from full-opened to full-closed, and vice versa, requires multiple rotations of the actuator 380. This permits the user to effectuate very small changes in the position of the valve shuttle 320 with ease and repeatability, which in turn allows for fine adjustments to the fluid flow through the rotameter 290.

The gear reduction value of worm gears depends on the ratio the number of worm gear teeth to worm thread starts. Worm thread "starts" refers to the actual number of worm gear threads, with the understanding that the worm driver, in this case the actuator 380, can include multiple individual helical worm gear threads 384 arranged in a nested configuration about the circumference of the actuator. The ratio, expressed as the number of worm gear teeth to worm thread starts, is, in turn, the ratio of actuator rotations to produce a corresponding number of valve stem rotations.

For instance, in the example embodiment illustrated in FIGS. 11-17, the worm gear threads 384 on the actuator 380 can have four starts and the valve shuttle 320 can include sixteen worm gear teeth 332. In this example, the worm gear reduction ratio would be 16:4 or 4:1, meaning that four complete rotations of the actuator would produce one complete rotation of the shuttle sleeve 330. Since it is the rotation of the shuttle sleeve 330 that results in the opening/closing movement of the valve shuttle 320 via the screw threads 326, 334, it becomes clear that the number of turns required to move the valve shuttle from fully-closed to fully-open is a matter of selecting the appropriate combination of worm gear ratio for the actuator and shuttle sleeve, along with the appropriate configuration and dimensions of the shuttle sleeve and valve shuttle screw threads. This provides an advantageously high degree of resolution in selecting and fine-tuning the flow through the rotameter 290.

The combination worm gear/screw thread actuation feature of the valve assembly 302 is also advantageous because it provides these high-resolution features in a small and compact design a valve capable of permitting comparatively high flow rates through the rotameter 290. This design allows the entire valve assembly, save the knob 390 and the end knob portion 386 of the actuator 380, to be positioned within a space, i.e., the valve chamber 300, that has essentially the same or slightly larger diameter as the outside diameter (O.D.) of the conduit that delivers the fluid to the rotameter 290. This can help to minimize the required size of the rotameter body 20. This can be especially advantageous because the body 20, when formed from a cast acrylic material, is the most expensive component of the rotameter 290 to produce.

Advantageously, the threaded stem 322 of the valve shuttle 320 threading directly into the shuttle sleeve 330 causes the forces applied to the valve shuttle to be applied along the central axis, i.e., axis 336, of the stem. This helps eliminate cantilever forces that otherwise could occur, for example, where the force applied to the stem 322 in a transverse or offset manner.

Additionally, the stem 322 and shuttle sleeve 330 being supported/nested between the two housing parts 312, 314 maintains the position and alignment of these two components. This helps provide a more smooth, reliable, and robust performance of the valve 302.

Furthermore, this two-piece housing construction allows those components to be produced through manufacturing processes of lesser complexity than otherwise would be required in a one-piece housing construction. For example, the two-piece housing construction can be achieved purely through a one shot molding process, whereas a one piece housing would require processes, such as machining, in addition to a molding process. This reduced complexity can provide a cost savings advantage.

The configuration of the valve assembly 302 described and illustrated in the preceding paragraphs and with reference to FIGS. 11-17 is not meant to limit the scope of the invention to that particular configuration. The configurations of the valve assembly 302 and the various components thereof can be altered or otherwise changed without departing from the spirit and scope of the invention. For example, although the actuator 380, shuttle sleeve 330, and valve shuttle 320 of the embodiment illustrated in FIGS. 11-17 are shown and described as being arranged on offset, perpendicular axes 392, 336, those skilled in the art will appreciate that it is not necessary that those axes extend perpendicular to each other. The worm gear teeth 332 on the shuttle sleeve 330 and the worm gear threads 384 on the actuator 380 can be configured so that the axes 392, 336 extend at non-perpendicular angles relative to each other.

The example embodiments presented in the foregoing description are not meant to be exhaustive of all possible configurations. It should be appreciated that a vast number of additional variations exist, and that the example embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A rotameter comprising:
   a rotameter body comprising an inlet, an outlet, and a flow channel that provides fluid communication between the inlet and the outlet; and
   a valve for controlling fluid flow through the inlet, the valve comprising:
   a valve housing comprising an opening with internal screw threads;
   an actuator rotatable about a first axis, the actuator comprising worm gear threads;
   a valve stem rotatable about a second axis that extends transverse to the first axis, the valve stem comprising worm gear teeth that occupy a first longitudinal section of the valve stem, the worm gear teeth mating with the worm gear threads on the actuator so that rotation of the actuator about the first axis imparts rotation of the valve stem about the second axis,
   wherein the valve stem extends through the opening on the valve housing and further comprises external screw threads that occupy a second longitudinal section of the valve stem, the external screw threads mating with the internal screw threads on the valve housing such that rotation of the valve stem about the second axis causes linear movement of the valve stem along the second axis; and
   a valve component configured for linear movement along the second axis with the valve stem, the linear movement of the valve component opening and closing the valve, wherein the valve component comprises a plate support piece for supporting a seal plate on a terminal end of the valve stem, the plate support piece facilitating rotation of the seal plate about the first axis relative to the valve stem.

2. The rotameter recited in claim 1, wherein the valve stem and the plate support piece are constructed of the same material in order to minimize wear due to frictional engagement between those parts during use, the plate support piece isolating the seal plate from the frictional engagement to facilitate the seal plate being constructed of a material that facilitates a water-tight seal with the material used to construct the rotameter body.

3. The rotameter recited in claim 1, wherein the valve stem comprises a head that is configured for sliding engagement with a channel on the plate support piece to connect the plate support piece to the valve stem and to facilitate the rotation of the support piece relative to the stem.

4. The rotameter recited in claim 1, wherein the length of the second longitudinal section is selected to permit the valve stem to move longitudinally along the second axis while maintaining contact between the worm gear threads and the worm gear teeth.

5. A rotameter comprising:
a rotameter body comprising an inlet including a cylindrical valve chamber, an outlet, and a flow channel that provides fluid communication between the inlet and the outlet;
a valve housing comprising first and second valve housing parts that are configured to be assembled together and positioned within the valve chamber, the valve housing parts having cylindrical surfaces that engage and mate with the cylindrical valve chamber;
an adaptor screwed into the inlet to press and hold the valve housing parts together and lock the valve housing in the valve chamber, the adaptor being connectable to a fluid conduit for directing fluid into the rotameter inlet;
an actuator comprising a shaft having a portion that extends through an actuator opening in the rotameter body opposite the inlet into the valve chamber, the actuator having a portion comprising worm gear threads seated between the valve housing parts;
a valve sleeve seated between the valve housing parts for rotation in the valve housing, the valve sleeve comprising worm gear teeth that engage and mate with the worm gear threads, wherein the actuator is rotatable about a first axis to impart rotation of the valve sleeve about a second axis, transverse to the first axis, due to the engagement of the worm gear threads and worm gear teeth;
a valve stem that includes external threads that engage and mate with internal threads of the valve sleeve and includes a portion that extends outside the valve housing, wherein the valve stem moves linearly within the valve chamber along the second axis in response to rotation of the valve sleeve about the second axis; and
a seal plate that moves linearly along the second axis with the valve stem into engagement with portions of the valve chamber to close an aperture through which fluid flows into the flow channel, and away from the portions of the valve chamber to open the aperture through which fluid flows into the flow channel.

6. The rotameter recited in claim 5, wherein the worm gear teeth are formed on an outer surface of the shuttle sleeve and wherein the worm gear teeth and the first screw threads are arranged along the same portion of the length of the shuttle sleeve.

7. The rotameter recited in claim 5, wherein the valve further comprises a valve housing for supporting the valve shuttle and shuttle sleeve, the stem of the valve shuttle comprising a flat that engages a surface of the housing, which prevents rotation of the stem and helps ensure that rotation of the shuttle sleeve causes linear movement of the valve shuttle.

8. The rotameter recited in claim 7, wherein the housing has a two piece construction configured to receive the valve shuttle threaded into the shuttle sleeve.

9. The rotameter recited in claim 8, wherein the housing comprises portions that act as bushings for supporting the shuttle sleeve for rotation relative to the housing.

10. The rotameter recited in claim 5, wherein the valve shuttle comprises a seal plate constructed of a material that facilitates a water-tight seal with the material used to construct the rotameter body.

11. The rotameter recited in claim 5, wherein the worm gear threads and worm gear teeth in combination form a worm gear for actuating the valve.

12. The rotameter recited in claim 5, wherein the worm gear threads and worm gear teeth are selected to produce a gear reduction in which a single rotation of the valve drive element requires multiple rotations of the actuator.

13. The rotameter recited in claim 12, wherein the gear reduction is 4:1, wherein a single rotation of the valve drive element requires four rotations of the actuator.

14. The rotameter recited in claim 5, wherein the worm gear threads have four starts and the valve drive element includes sixteen worm gear teeth.

15. The rotameter recited in claim 5, wherein the rotameter further comprises a control knob connected to the actuator outside the rotameter body, the knob being manually rotatable to control the valve.

16. The rotameter recited in claim 5, further comprising an indicator positioned in the flow channel and viewable against indicia on the rotameter body, the indicator moving in response to flow in the channel and indicating via the indicia the magnitude of the fluid flow through the channel.

17. The rotameter recited in claim 5, wherein the rotameter body is constructed of a single piece of material.

18. The rotameter recited in claim 17, wherein the rotameter body is constructed of a cast acrylic material.

* * * * *